US010843654B2

(12) United States Patent
Wiscombe et al.

(10) Patent No.: US 10,843,654 B2
(45) Date of Patent: Nov. 24, 2020

(54) SIDE AIRBAG ASSEMBLY

(71) Applicant: Autoliv ASP, Inc., Ogden, UT (US)

(72) Inventors: Derek John Wiscombe, Morgan, UT (US); Charles Paul Dinsdale, Farr West, UT (US); Don Larry Parker, Syracuse, UT (US); Andy Lawrence Holliday, Pleasant View, UT (US); Terry Alan Wheelwright, Morgan, UT (US)

(73) Assignee: Autoliv ASP, Inc., Ogden, UT (US)

( * ) Notice: Subject to any disclaimer, the term of this patent is extended or adjusted under 35 U.S.C. 154(b) by 48 days.

(21) Appl. No.: 16/395,739

(22) Filed: Apr. 26, 2019

(65) Prior Publication Data

US 2020/0339060 A1    Oct. 29, 2020

(51) Int. Cl.
*B60R 21/231* (2011.01)
*B60R 21/233* (2006.01)
*B60R 21/207* (2006.01)

(52) U.S. Cl.
CPC ...... *B60R 21/23138* (2013.01); *B60R 21/207* (2013.01); *B60R 21/233* (2013.01); *B60R 2021/23146* (2013.01); *B60R 2021/23324* (2013.01)

(58) Field of Classification Search
CPC ............ B60R 21/23138; B60R 21/233; B60R 21/207; B60R 2021/23146; B60R 2021/23324
See application file for complete search history.

(56) References Cited

U.S. PATENT DOCUMENTS

| 5,556,128 A | 9/1996 | Sinnhuber |
| 5,803,485 A | 9/1998 | Acker et al. |
| 5,927,748 A | 7/1999 | O'Driscoll |

(Continued)

FOREIGN PATENT DOCUMENTS

| DE | 10323129 | 12/2004 |
| DE | 202006014012 | 2/2008 |

(Continued)

OTHER PUBLICATIONS

Wiscombe, et al., Notice of Allowance dated Jul. 6, 2020 for U.S. Appl. No. 15/996,036.

(Continued)

*Primary Examiner* — Drew J Brown
(74) *Attorney, Agent, or Firm* — Stoel Rives LLP

(57) ABSTRACT

A side inflatable airbag assembly for a vehicle is disclosed. Inflatable airbag assemblies may provide protection for an occupant in a vehicle collision event. In a side collision event, or other event producing lateral movement of the occupant relative to the vehicle, the disclosed inflatable airbag assembly may receive and support the occupant during ride down so as to prevent or minimize injury resulting from impact with a vehicle door, sidewall, center console, or other vehicle structure disposed lateral to the vehicle seating position. The disclosed airbag may differentially support the occupant by providing varied degrees of support for the shoulder, pelvis, and torso, which may be particularly beneficial to an elderly occupant whose bones may be more susceptible to some injury types and modes as a result of age-incident health issues.

12 Claims, 16 Drawing Sheets

(56) References Cited

U.S. PATENT DOCUMENTS

| | | |
|---|---|---|
| 6,349,964 B1 | 2/2002 | Acker et al. |
| 7,168,733 B2 | 1/2007 | Kumagai et al. |
| 7,611,164 B2 | 11/2009 | Kai et al. |
| 8,282,126 B2 | 10/2012 | Wiik et al. |
| 8,684,408 B2 | 4/2014 | Thomas et al. |
| 10,391,966 B2 | 8/2019 | Kunisada et al. |
| 2003/0160433 A1 | 8/2003 | Kumagai et al. |
| 2003/0168836 A1 | 9/2003 | Sato et al. |
| 2005/0006883 A1 | 1/2005 | Sato et al. |
| 2005/0062266 A1 | 3/2005 | Steimke et al. |
| 2005/0189742 A1* | 9/2005 | Kumagai .......... B60R 21/23138 280/730.2 |
| 2006/0001244 A1 | 1/2006 | Taguchi et al. |
| 2006/0022439 A1 | 2/2006 | Bayley et al. |
| 2006/0022441 A1* | 2/2006 | Hayashi ............ B60R 21/23138 280/730.2 |
| 2006/0071458 A1 | 4/2006 | Sendelbach et al. |
| 2007/0164546 A1 | 7/2007 | Kai et al. |
| 2009/0212542 A1 | 8/2009 | Toda et al. |
| 2010/0133796 A1* | 6/2010 | Mizuno ................ B60R 21/235 280/743.1 |
| 2011/0079991 A1 | 4/2011 | Ravenberg et al. |
| 2012/0049498 A1 | 3/2012 | Wiik et al. |
| 2012/0091697 A1* | 4/2012 | Wiik ................ B60R 21/23138 280/730.2 |
| 2012/0248447 A1 | 10/2012 | Sugimoto et al. |
| 2013/0076014 A1 | 3/2013 | Thomas et al. |
| 2015/0097359 A1 | 4/2015 | Rickenbach et al. |
| 2015/0115583 A1 | 4/2015 | Azuma et al. |
| 2016/0159310 A1 | 6/2016 | Kobayashi et al. |
| 2016/0200278 A1* | 7/2016 | Wiik ...................... B60R 21/233 280/729 |
| 2016/0221528 A1 | 8/2016 | Sugimura et al. |
| 2017/0274862 A1* | 9/2017 | Mihm .................. B60R 21/233 |
| 2017/0274863 A1* | 9/2017 | Mihm .................. B60R 21/232 |
| 2018/0222433 A1* | 8/2018 | Byun .................. B60R 21/2338 |
| 2019/0225183 A1* | 7/2019 | Garnier ................ B60R 21/207 |
| 2019/0366970 A1 | 12/2019 | Wiscombe et al. |

FOREIGN PATENT DOCUMENTS

| | | |
|---|---|---|
| DE | 102017007885 | 4/2018 |
| EP | 0590518 | 9/1993 |
| EP | 1586489 | 10/2005 |
| JP | 4720753 B2 | 9/2008 |
| WO | 2011008916 A1 | 1/2011 |
| WO | 2019231604 | 12/2019 |

OTHER PUBLICATIONS

International Search Report and Written Opinion dated Jun. 25, 2020 for international application PCT/US2020/029373.

Wiscombe, et al., Office Action dated Dec. 12, 2019 for U.S. Appl. No. 15/996,036.

International Search Report and Written Opinion dated Aug. 26, 2019 for international application PCT/US2019/030200.

* cited by examiner

1

SIDE AIRBAG ASSEMBLY

TECHNICAL FIELD

The present disclosure relates generally to the field of automotive protective systems. More specifically, the present disclosure relates to airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1A:
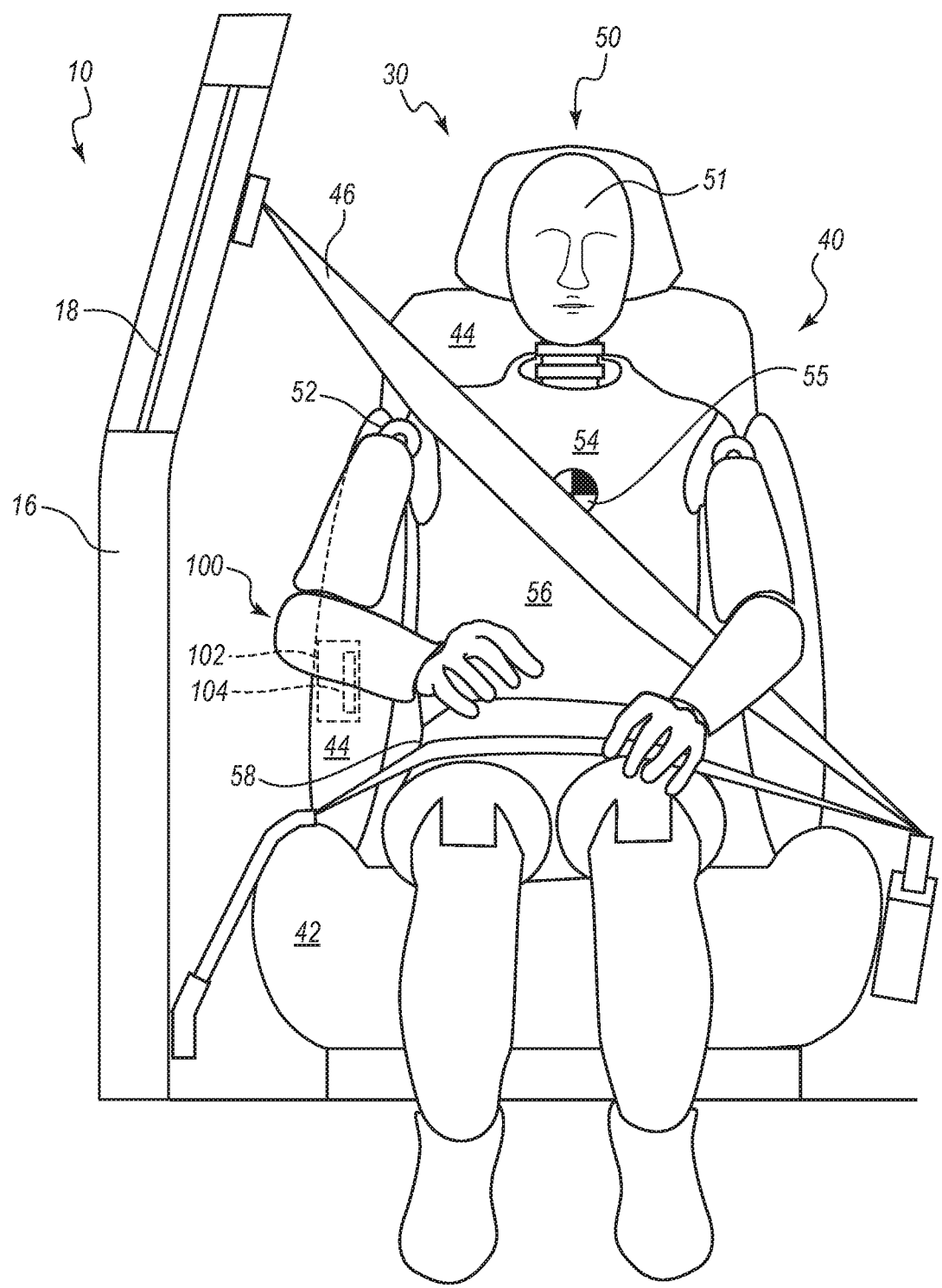
FIG. 1A is a front view of a portion of an interior of a vehicle with an inflatable airbag assembly, according to an embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. The present disclosure may afford protection particularly beneficial for an elderly occupant whose bones may be more susceptible to some injury types and modes as a result of age-incident health issues, and more so when involved in a side-impact collision or other event producing lateral movement (e.g., transverse to a longitudinal axis of the vehicle) of the occupant. In the following disclosure, "airbag" generally refers to an inflatable airbag that deploys at a side position (or at a position generally laterally adjacent to a vehicle seating position) to protect an occupant during a collision event.

During installation, airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from the packaged state to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors during a collision event.

Some embodiments of the airbag assembly disclosed herein may be more suitable to cushion a front-seat passenger, while other embodiments may be more particularly suitable for a passenger of a seat other than the front seat, such as a more rearward seat. An airbag assembly can mitigate injury to an occupant of a vehicle during a collision event by reducing the effect of impact of the occupant against structures (body-structure impact) within the vehicle (e.g., a door column, vehicle sidewall, or center console).

Some embodiments disclosed herein can provide improved positioning, cushioning, and/or safety to occupants involved in particular types of collisions. For example, some embodiments can be configured to cushion a vehicle driver and/or front-seat passenger seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap frontal crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the vehicle-forward direction.

FIG. 1A is front view of a portion of an interior of a vehicle 10 having an inflatable airbag assembly 100, according to an embodiment of the present disclosure. A sidewall 16 (e.g., a door) and a window 18 are shown for reference. The vehicle 10 includes at least one vehicle seating position 30. The vehicle seating position 30 of FIG. 1A can be defined by a seat assembly 40, which includes a seat 42, a seatback 44, and a restraint harness 46 (e.g., a seat belt). An occupant 50 is shown in the seat assembly 40, and the head 51, shoulder(s) 52, thorax 54, thoracic center 55, thoracoabdominal region 56, and pelvis 58 of the occupant 50 are shown for reference. The inflatable airbag assembly 100 may be mounted to or otherwise coupled to the seatback 44.

The inflatable airbag assembly 100 comprises a housing 102 and an inflator 104. The housing 102, in one embodiment, may be mounted to an interior portion of the seatback 44. The inflator 104 may be coupled to the housing 102, and may be disposed partially or completely within the housing 102.

Although FIG. 1A and other figures may illustrate the occupant 50 with the restraint harness 46 employed, the operation of the inflatable airbag assembly 100 is independent of, and does not depend in any way on, the restraint harness 46.

Figure 1B:
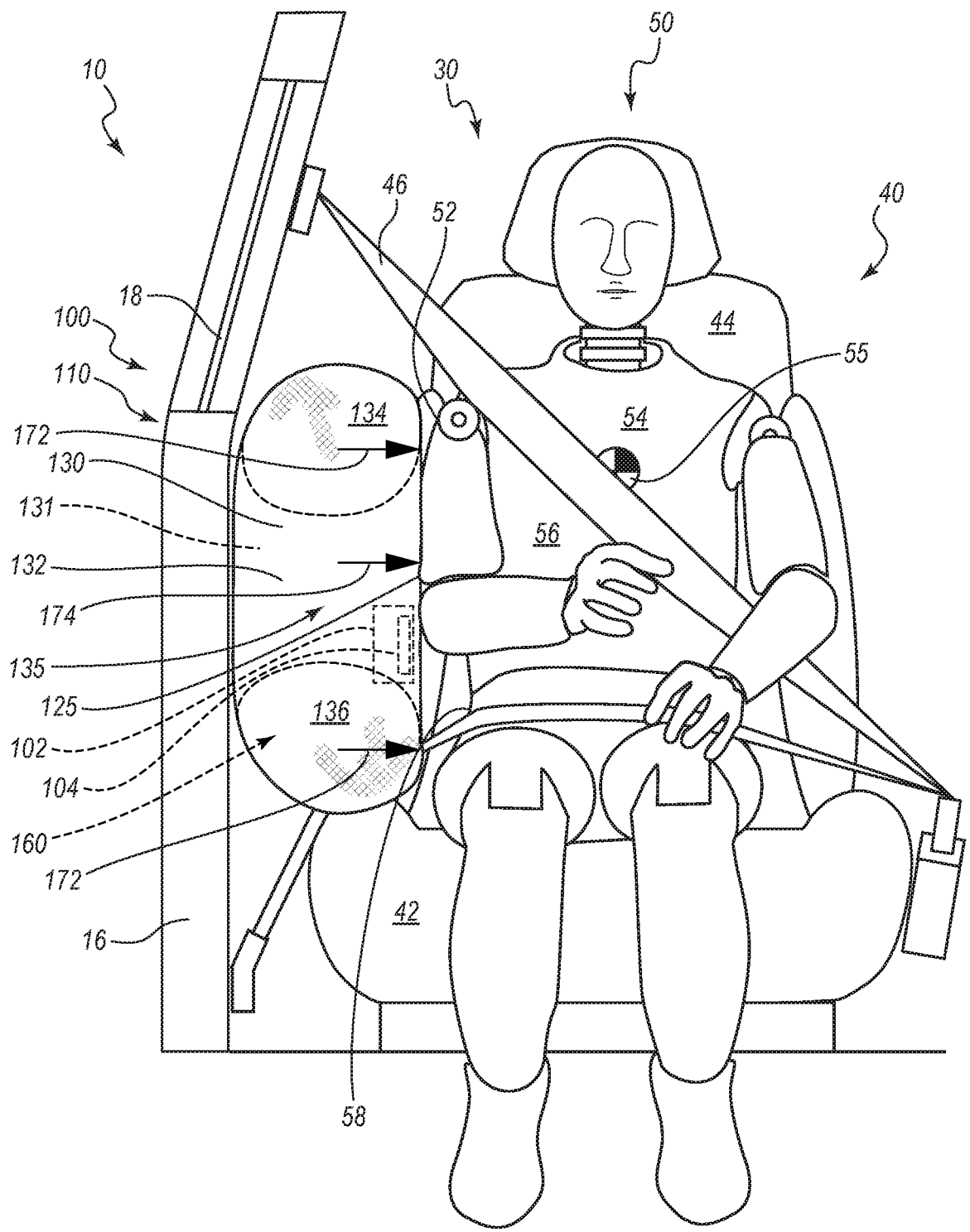
FIG. 1B is a front view of a portion of the interior of the vehicle with the inflatable airbag assembly of FIG. 1A deployed and at least partially inflated.

FIG. 1B is a front view of a portion of the interior of the vehicle 10, showing the inflatable airbag assembly 100 deployed and at least partially inflated. The sidewall 16 (e.g., a door or other panel) and window 18 of the vehicle 10 are shown for reference. The vehicle seating position 30 and the seat assembly 40, including the seat 42, seatback 44, and restraint harness 46, are shown for reference. The occupant 50 is shown seated in the seat assembly 40 prior to engaging the inflatable airbag assembly 100. The shoulder 52, thorax 54, thoracic center 55, thoracoabdominal region 56, and pelvis 58 are also shown for reference.

The inflatable airbag assembly 100 includes an inflatable airbag cushion 110. The inflatable airbag cushion 110 comprises a chamber 130 to be inflated via an inflator port (not shown, but see, e.g., 206 in FIG. 2A) to an inflation pressure. The inflatable airbag assembly 100 may be deployed by action of the inflator 104, which may be activated by, for example, one or more sensors detecting the vehicle 10 being involved in a collision event. The inflator 104 may provide inflation gas 160 to the inflatable airbag cushion 110 via the inflator port 206, and may thereby cause the inflatable airbag cushion 110 to deploy from the housing 102 and begin inflating. The inflatable airbag cushion 110 may inflate to be disposed forward from the housing 102 at the seatback 44 to a position adjacent to the vehicle seating position 30 and, more particularly in one embodiment, between the vehicle seating position 30 and the sidewall 16 of the vehicle 10.

The inflatable airbag cushion 110 may comprise regions disposed at specific locations when the inflatable airbag cushion 110 is deployed. The regions may be positioned in the deployed state to receive and engage specific portions of the occupant 50. The inflatable airbag cushion 110 may comprise an upper region 134 to engage the shoulder 52 and a lower region 136 to engage the pelvis 58. The inflatable airbag cushion 110 may further comprise a central region 135 to engage the thoracoabdominal region 56 of the occupant 50. The upper region 134 and the lower region 136 may be configured to avoid engagement with specific portions of the occupant 50, for example the thoracoabdominal region 56. Such avoidance by the upper region 134 and lower region 136 of specific portions of the occupant can limit and/or reduce engagement of the airbag cushion 110 with the occupant 50 and thereby limit and/or reduce impact of the airbag cushion 110 on the occupant 50 during a collision. The upper region 134 and the lower region 136 may be inflated portions of the chamber 130.

The inflatable airbag cushion 110 may also comprise regions that may be disposed at locations, when the inflatable airbag cushion 110 is deployed, to not engage the occupant 50. The inflatable airbag cushion 110 may comprise a rear region 131 to be disposed between the seat back 44 and the sidewall 16. As such, the rear region 131 may be positioned during a collision to be disposed lateral to and rearward of the occupant 50. The inflatable airbag cushion 110 may comprise a front region 132 to be disposed forward of the occupant 50. The rear region 131 and front region 132 may be inflated portions of the chamber 130. In FIG. 1B, the rear region 131 is hidden behind the front region 132.

The central region 135 may be formed or otherwise defined by an arrangement of the regions (e.g., upper region 134, lower region 136, rear region 131, and front region 132). The central region 135 may be a void, gap, or opening formed by the inflatable cushion 110 and configured to avoid contact with areas of the occupant 50 when engaging the airbag cushion 110, such as during a collision event.

The inflatable airbag cushion 110 may comprise a contact panel 125 or sail coupled to the chamber 130. The contact panel 125 may be coupled to the chamber 130 on a lateral side of the airbag cushion 110 adjacent the occupant 50 as illustrated in FIG. 1B. The contact panel 125 may be positioned such that at least a portion of the contact panel 125 is disposed between at least a portion of the chamber 130 and the occupant 50. In some embodiments, the contact panel 125 may be positioned such that the contact panel 125 is disposed between the occupant 50 and the entire chamber 130. The contact panel 125 may be coupled to the chamber 130 along a portion of a perimeter of the contact panel 125 or along an entire perimeter of the contact panel 125. The contact panel 125 may be disposed across the central region 135 of the chamber 130.

The inflation pressure within the chamber 130 may provide a relatively high resistance to movement 172 to counteract (e.g., exert a force against) movement of a portion of the occupant 50, upon engagement of the occupant 50 with the inflatable airbag cushion 110. The high resistance to movement 172 may be defined by the inflation pressure. The upper region 134 and the lower region 136 of the chamber 130 may comprise the high resistance to movement 172.

The inflatable airbag cushion 110 may be configured to produce a tension in the contact panel 125 upon inflation of the chamber 130. More specifically, the chamber 130 may expand upon inflation causing separation of opposing portions of the coupling between the first contact panel 125 and the chamber 130 resulting in tension in the first contact panel 125. In some embodiments, the chamber 130 may expand upon inflation producing a radially directed tensile force along an entire perimeter of the contact panel 125, which may, in turn, create a radially directed tension in the contact panel 125.

The tension in the contact panel 125 may define a lower resistance to movement 174 to counteract movement of a portion of the occupant 50 at the central region 135. The central region 135 may be a non-inflated region of the inflatable airbag cushion 110 and thus contain no inflation gas 160. In other words, the pressure on both sides of the contact panel 125, as disposed across the central region 135, may be ambient pressure. Hence, inflatable airbag cushion 110 may engage the thoracoabdominal region 56 of the occupant 50 with the lower resistance to movement 174 provided at the central region 135.

Both the shoulder 52 and pelvis 58 of the occupant 50 may have greater integral strength from bone structure than does the thoracoabdominal region 56 (nominally, the rib cage). In particular, the thoracoabdominal region 56 in an elderly occupant 50 may be more vulnerable, because an elderly occupant 50 may have bones that may be more brittle or susceptible to breakage as a result of age-incident health issues. With the inflatable airbag cushion 110 configured to receive the shoulder 52 and pelvis 58 at the high resistance to movement 172 provided by the upper region 134 and the lower region 136, and to receive the thoracoabdominal region 56 at the lower resistance to movement 174 provided by the central region 135, the occupant 50 may be received by the inflatable airbag cushion 110 and supported in a manner that may reduce impact to the occupant 50 generally, and to the thoracoabdominal region 56 particularly.

Figure 1C:
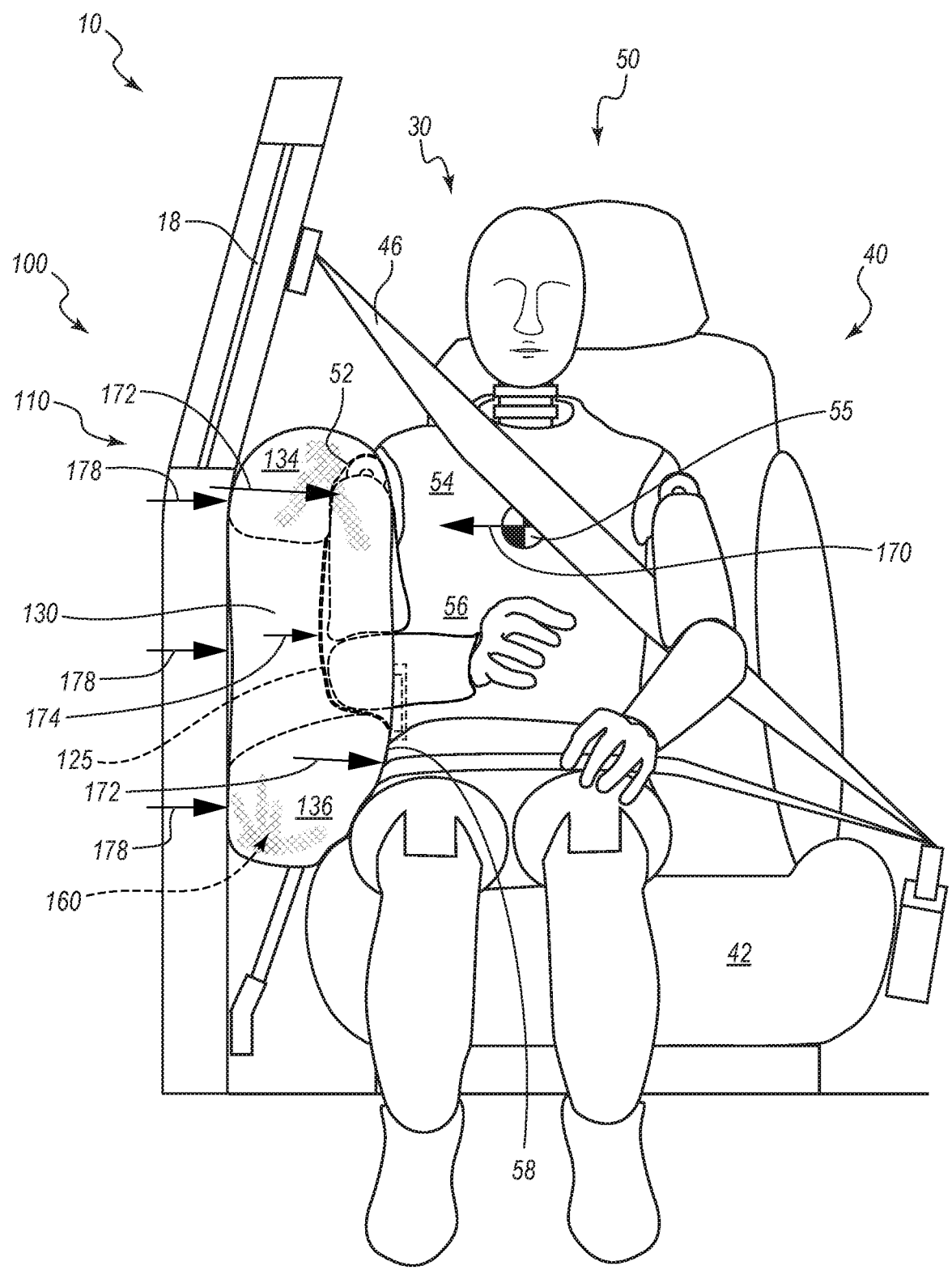
FIG. 1C is a front view of a portion of the interior of the vehicle with the inflatable airbag assembly of FIGS. 1A and 1B in a deployed state and with the occupant engaging the inflatable airbag cushion.

FIG. 1C is a front view of a portion of the interior of the vehicle 10, showing the inflatable airbag assembly 100 of FIGS. 1A-1B in a deployed and at least partially inflated state, with the occupant 50 engaging the inflatable airbag cushion 110. The occupant 50 is shown in the seat assembly 40 in the vehicle seating position 30. The thorax 54, thoracic center 55, thoracoabdominal region 56, and pelvis 58 of the occupant 50 are shown for reference, as are the seat 42, seatback 44, and restraint harness 46 of the seat assembly 40. The occupant 50 has traveled in a lateral direction 170 and is shown engaging the inflatable airbag cushion 110. More particularly, the thoracic center 55 has shifted (relative to FIG. 1B) in the lateral direction 170. The front region 132 may be disposed lateral to and forward of the occupant 50 and the rear region 131 may be disposed lateral to and rearward of the occupant 50. The shoulder 52 of the occupant 50 is engaging the upper region 134 of the chamber 130, the pelvis 58 of the occupant 50 is engaging the lower region 136 of the chamber 130, and the thoracoabdominal region 56 of the occupant 50 is engaging the central region 135. In other words, initially and simultaneously or nearly simultaneously, the shoulder 52 may engage the high resistance to movement 172 of the upper region 134, the pelvis 58 may engage the high resistance to movement 172 of the lower region 136, and the thoracoabdominal region 56 may engage the lower resistance to movement 174 of the central region 135.

The sidewall 16 (e.g., door) of the vehicle 10 may serve as a reaction surface to provide a support 178 to the chamber 130 of the inflatable airbag cushion 110. The chamber 130 may assist in ensuring the upper region 134 and lower region 136 remain properly disposed to support the shoulder 52 and pelvis 58, respectively, during ride down. The chamber 130 may also assist in ensuring that the central region 135 remains properly disposed to engage the thoracoabdominal region 56 of the occupant 50 and that the contact panel 125 remains in tension during ride down.

Figure 1D:
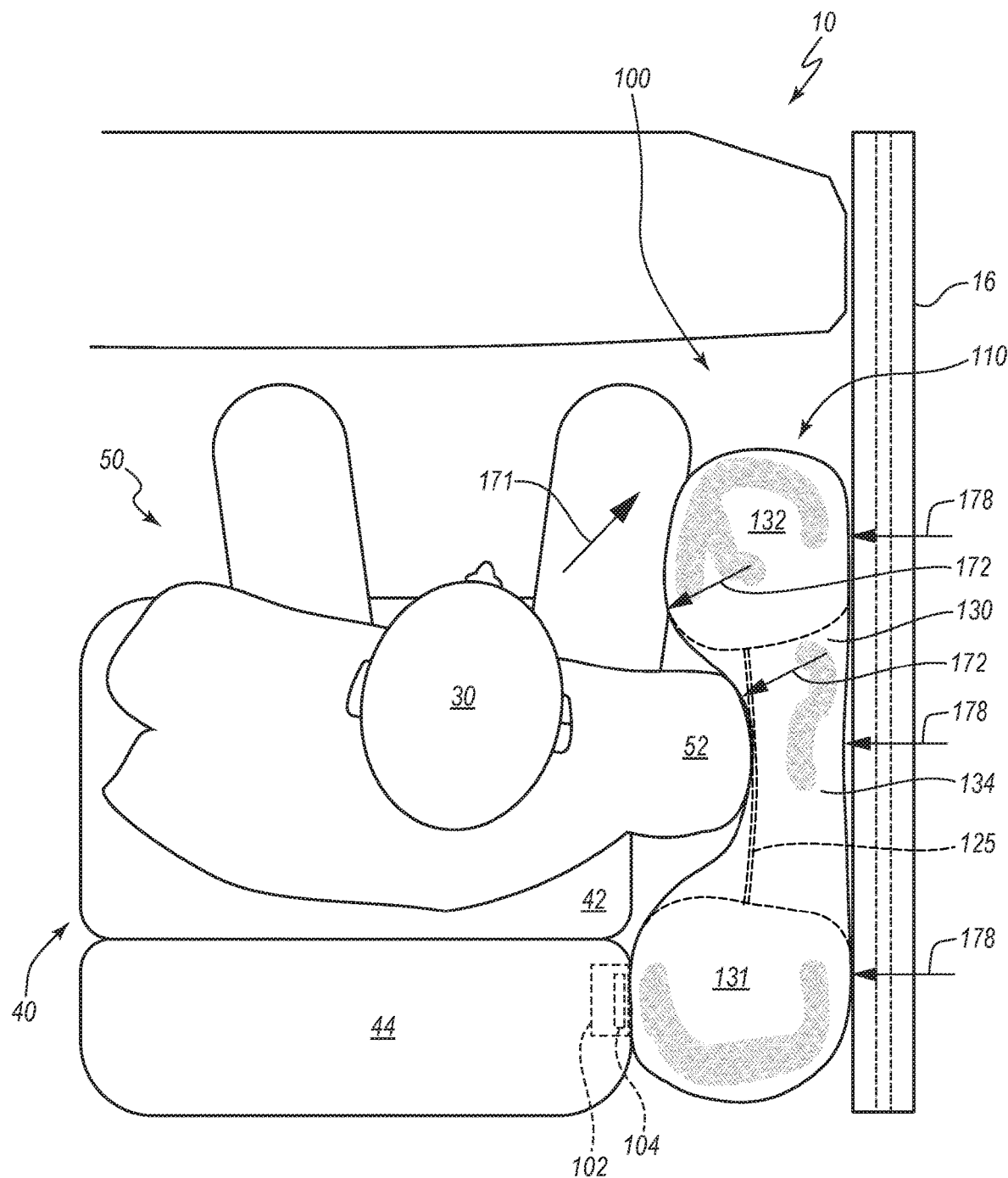
FIG. 1D is a top view of a portion of the interior of the vehicle with the inflatable airbag assembly of FIGS. 1A, 1B, and 1C in a deployed state and with the occupant engaging the inflatable airbag cushion.

FIG. 1D is a top view of a portion of the interior of the vehicle 10, showing the inflatable airbag assembly 100 of FIGS. 1A-1C in a deployed and at least partially inflated state, with the occupant 50 engaging the inflatable airbag cushion 110 as may be the case during an oblique collision event. In such an oblique collision instance, the occupant may move in an oblique direction 171, i.e., forward and laterally. In an oblique collision, the front region 132 may engage the occupant 50 and provide a high resistance to movement 172 of portions of the occupant 50, inter alia, the head 51, shoulder(s) 52, thorax 54, thoracic center 55, thoracoabdominal region 56, and pelvis 58. In some instances of oblique impact, the inflatable airbag cushion 110 may also provide a lower resistance to movement 174 to the thoracoabdominal region 56.

Figure 2A:
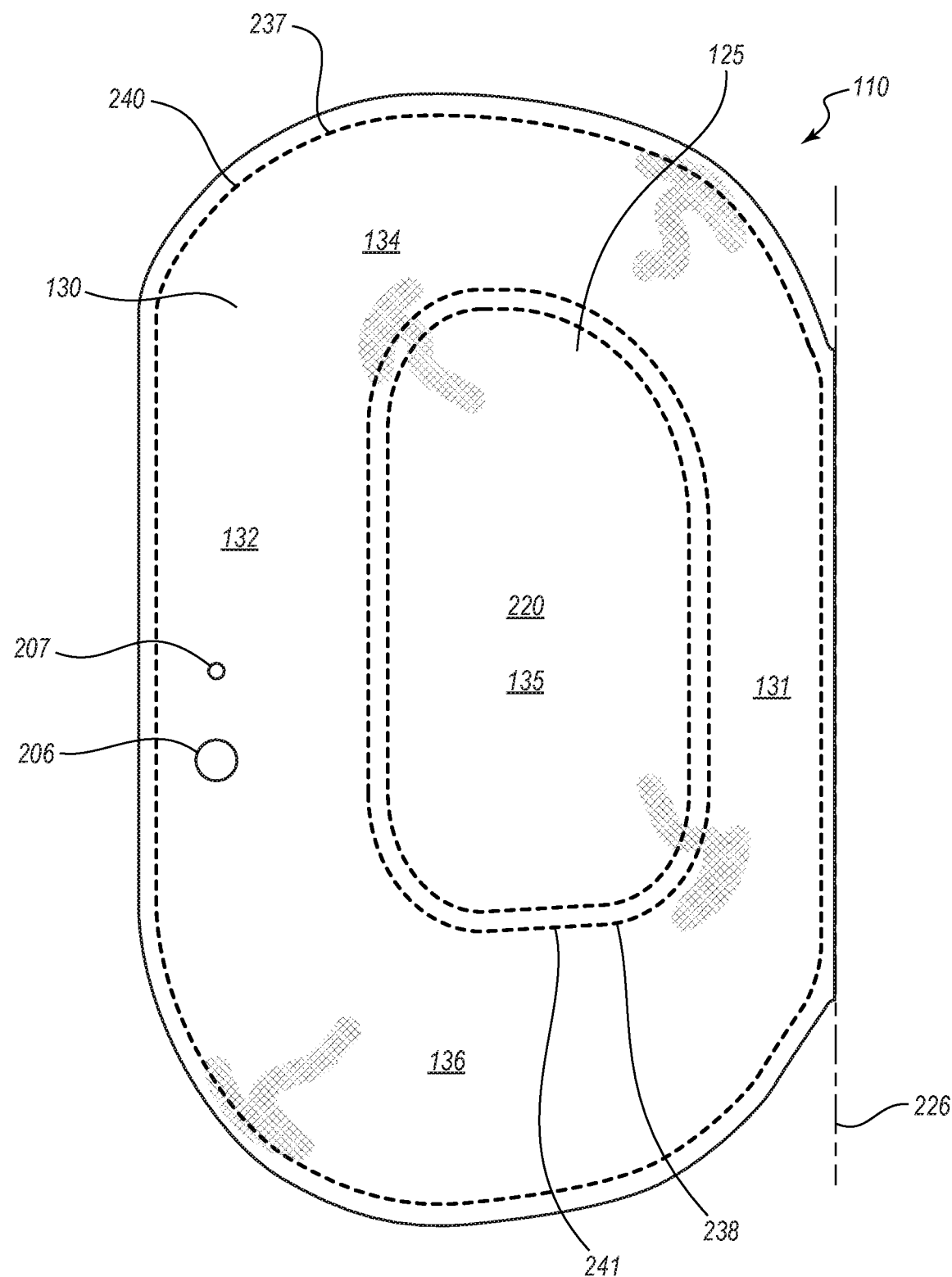
FIG. 2A is a side view of the inflatable airbag cushion of FIGS. 1A to 1C in an uninflated state.
Figure 2B:
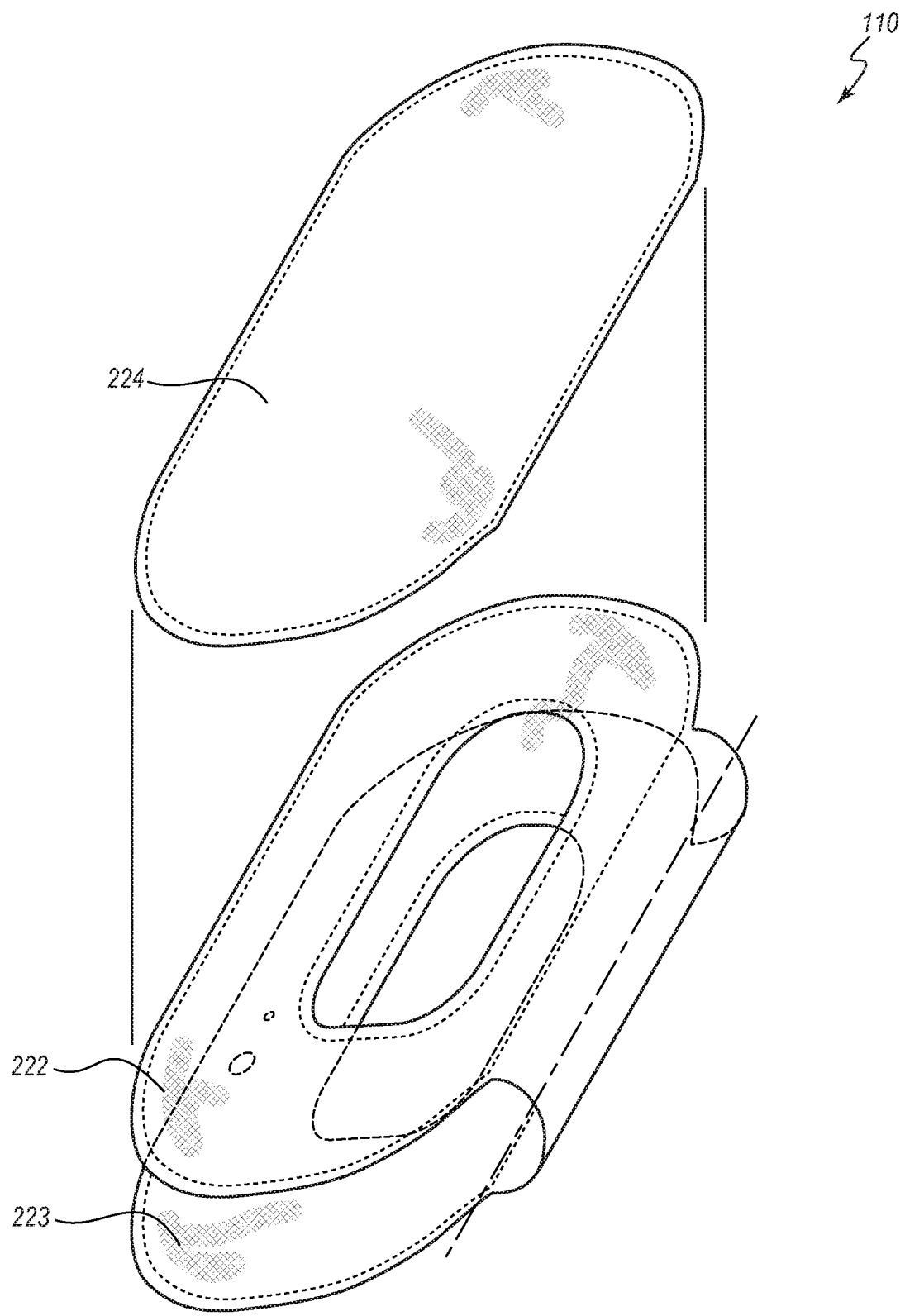
FIG. 2B is a partially exploded perspective view of the inflatable airbag cushion of FIGS. 1A to 1C.

FIG. 2A is a side view of a side of the inflatable airbag cushion 110 of FIGS. 1A to 1C in an uninflated state. FIG. 2B is an exploded perspective view of the inflatable airbag cushion 110. With reference to FIGS. 2A and 2B, the inflatable airbag cushion 110 may include a first fabric panel 222 and a second fabric panel 223. In the illustrated embodiment, the first fabric panel 222 and second fabric panel 223 form the chamber 130. The first fabric panel 222 and second fabric panel 223 may be formed of a single unitary fabric panel, the fabric panel folded along a fold line 226 and coupled along an outer coupling 240 and an inner coupling 241. Each of the outer coupling 240 and the inner coupling 241 may be formed of a continuous seam. The first fabric panel 222 and second fabric panel 223 may be sealed together along a portion of the outer coupling 240. Similarly, the first fabric panel 222 and second fabric panel 223 may be sealed together along a portion of the inner coupling 241. In some embodiments, the first fabric panel 222 and second fabric panel 223 may be sealed together along the entire outer coupling 240 and/or the entire inner coupling 241. In some embodiments, the outer coupling 240 and/or the inner coupling 241 may comprise a non-sealed portion to facility venting of inflation gas 160. A seam may be formed by sewing, adhesive, radio-frequency welding, or taping, or in any other suitable manner or combinations thereof.

The chamber 130, when inflated, may form a generally toroidal shape defining an inner toroidal region 220. The inner toroidal region 220 may comprise the central region 135. The toroidal shape of the chamber 130 may also define the front region 132, the rear region 131, the upper region 134, and the lower region 136. The chamber 130 may include an outer perimeter 237 extending around the exterior of the toroidal shape (e.g., an outermost perimeter of the inflatable airbag cushion 110 on an exterior surface of one or more of the first fabric panel 222 and the second fabric panel 223). In some embodiments, a portion of one or more of the fabric panels 222, 223 extends beyond the outer perimeter 237 (of the chamber 130) and the outer coupling 240. The chamber 130 may also include an inner perimeter 238 extending around the inner region 220 of the toroidal shape (e.g., an innermost perimeter of the toroidal shape of the chamber 130 on an exterior surface of one or more of the first fabric panel 222 and the second fabric panel 223). In some embodiments the outer perimeter 237 may be defined by the outer coupling 240 and the inner perimeter 238 may be defined by the inner coupling 241. The outer perimeter 237 and the inner perimeter 238 may define lateral sides of the chamber 130. An occupant-facing side of the chamber 130 may be defined by the portion of the exterior surface of the chamber 130 extending between the outer perimeter 237 and the inner perimeter 238 on the occupant side of the chamber 130. Similarly, an opposite sidewall-facing side of the chamber 130 may be may be defined by the portion of the exterior surface of the chamber 130 extending between the outer perimeter 237 and the inner perimeter 238 on the side of the chamber 130 facing the vehicle sidewall 16. In some embodiments, the inflatable airbag cushion 110 and/or chamber 130 may be obround, wherein one cross-sectional dimension is greater than a perpendicular cross-sectional dimension. In the illustrated embodiment, the first fabric panel 222 and second fabric panel 223 may not be disposed across the inner region 220, leaving an opening through the inner toroidal region 220. The inflator port 206 may comprise an aperture passing through at least one of the first fabric panel 122 and second fabric panel 223 to the interior of the chamber 130. In other words, the inflator port 206 may be configured to admit inflation gas to the chamber 130.

In some embodiments, the chamber 130 may comprise an exhaust vent 207. The exhaust vent 207 may facilitate ride down of an occupant at impact with the inflated airbag cushion 110.

The inflatable airbag cushion 110 may comprise a third fabric panel 224 coupled to the first chamber 130. The third fabric panel 224 may be coupled to the first chamber 130 at the outer coupling 240 or the inner coupling 241. In some embodiments, the third fabric panel 224 may be coupled to the first fabric panel 222 at a location between the outer coupling 240 and the inner coupling 241. The third fabric panel 224 may define the contact panel 125. In some embodiments, a portion of a perimeter or the entire perimeter of the third fabric panel 224 may be coupled to one or both of the first fabric panel 222 and the second fabric panel 223 at the outer coupling 240 or the inner coupling 241. In some embodiments, the first fabric panel 222, the second fabric panel 223, and the third fabric panel 224 may have a common perimeter. In some embodiments, the outer coupling 240 may couple the first fabric panel 222, the second fabric panel 223, and the third fabric panel 224 together. In other embodiments, one or both of the first fabric panel 222 and the second fabric panel 223 may be disposed across the inner toroidal 120 region and form the contact panel 125, in which embodiments the third fabric panel 224 is omitted.

Figure 3A:
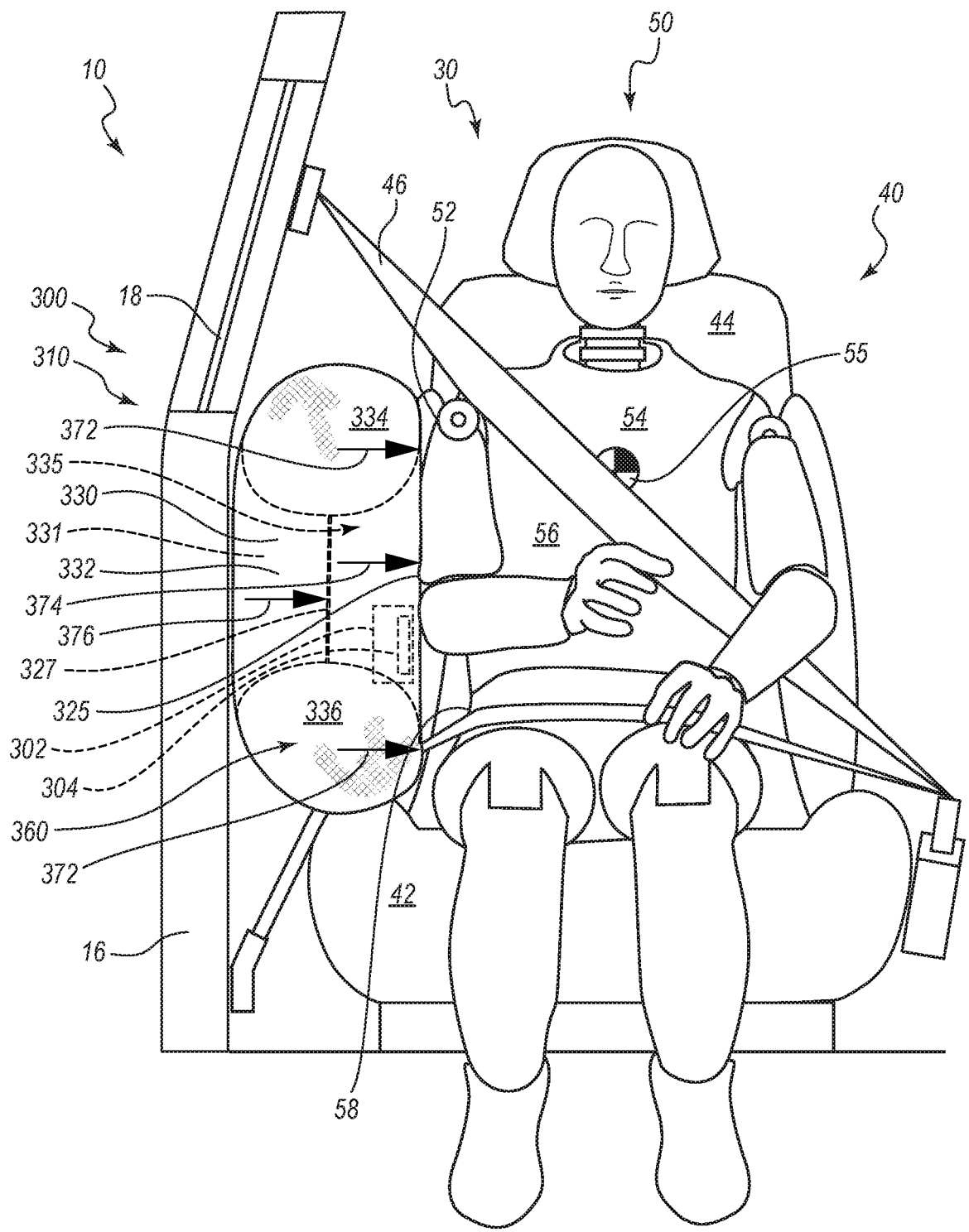
FIG. 3A is a front view of a portion of an interior of a vehicle with an inflatable airbag assembly, according to a second embodiment of the present disclosure, showing the inflatable airbag assembly in a deployed and at least partially inflated state.
Figure 3B:
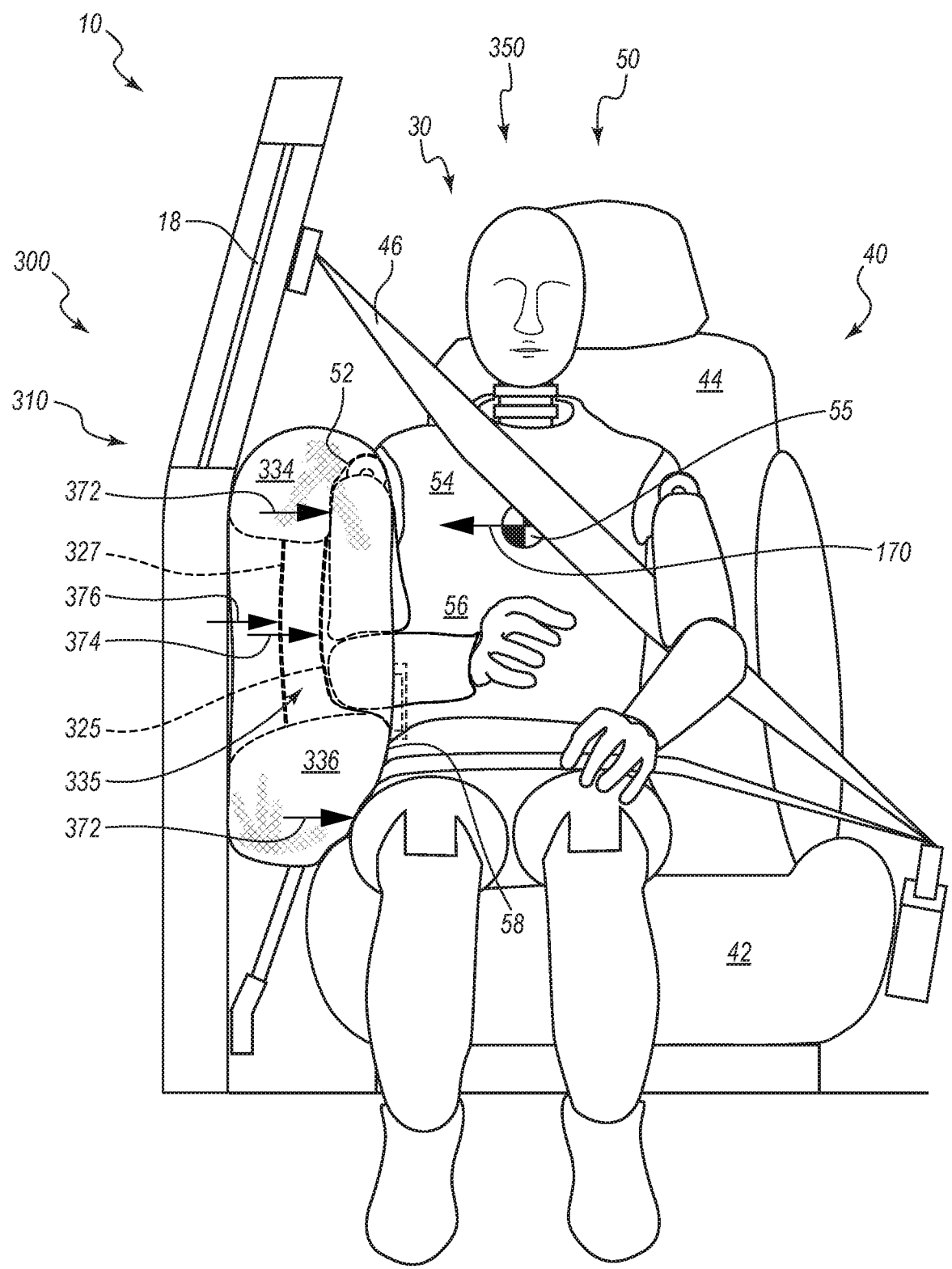
FIG. 3B is a front view of a portion of the interior of the vehicle with the inflatable airbag assembly of FIG. 3A in a deployed state and with the occupant engaging the inflatable airbag cushion.
Figure 3C:
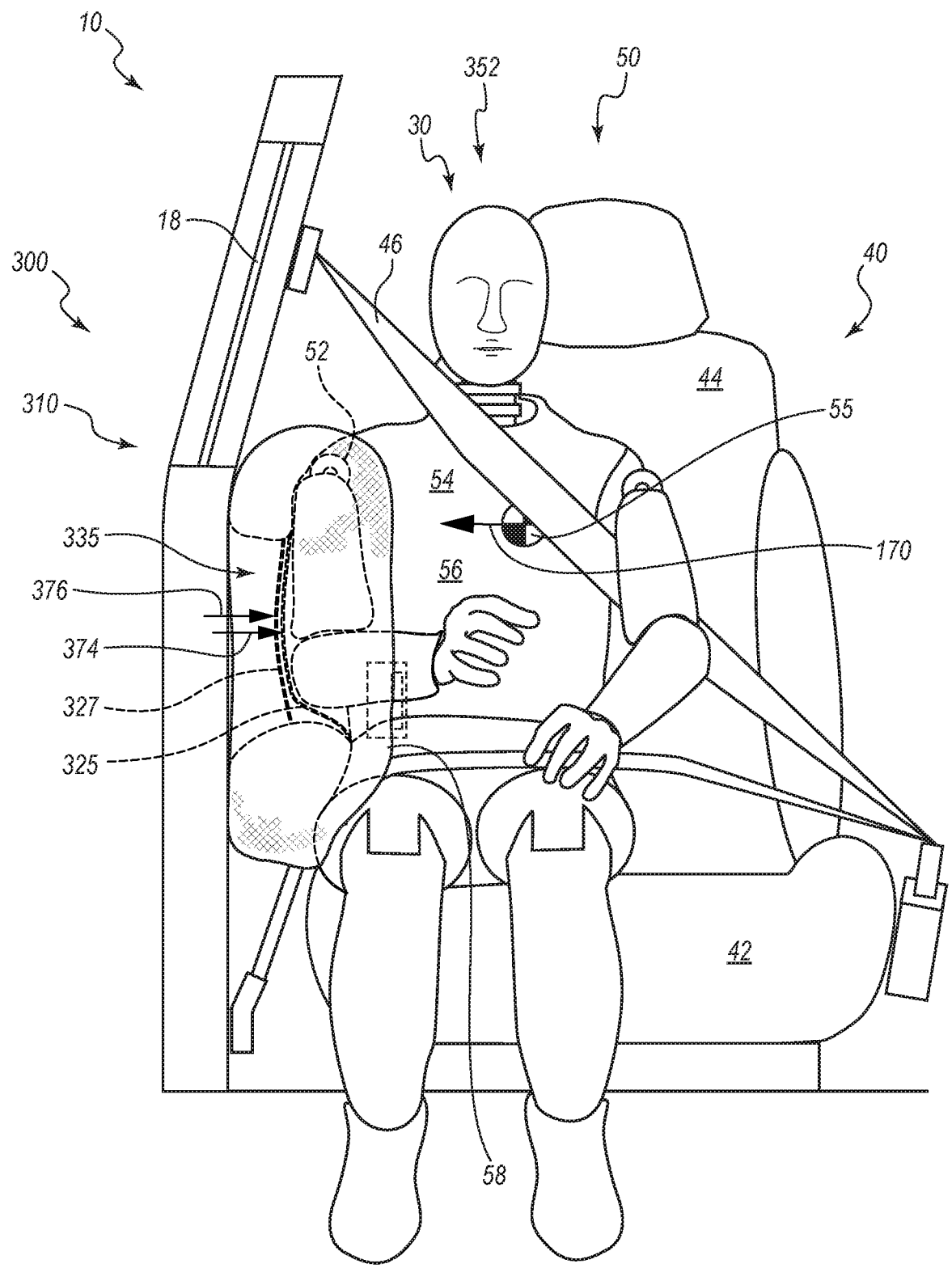
FIG. 3C is a front view of a portion of the interior of the vehicle with the inflatable airbag assembly of FIG. 3A in a deployed state and with the occupant further engaging the inflatable airbag cushion in relation to FIG. 3B.
Figure 4A:
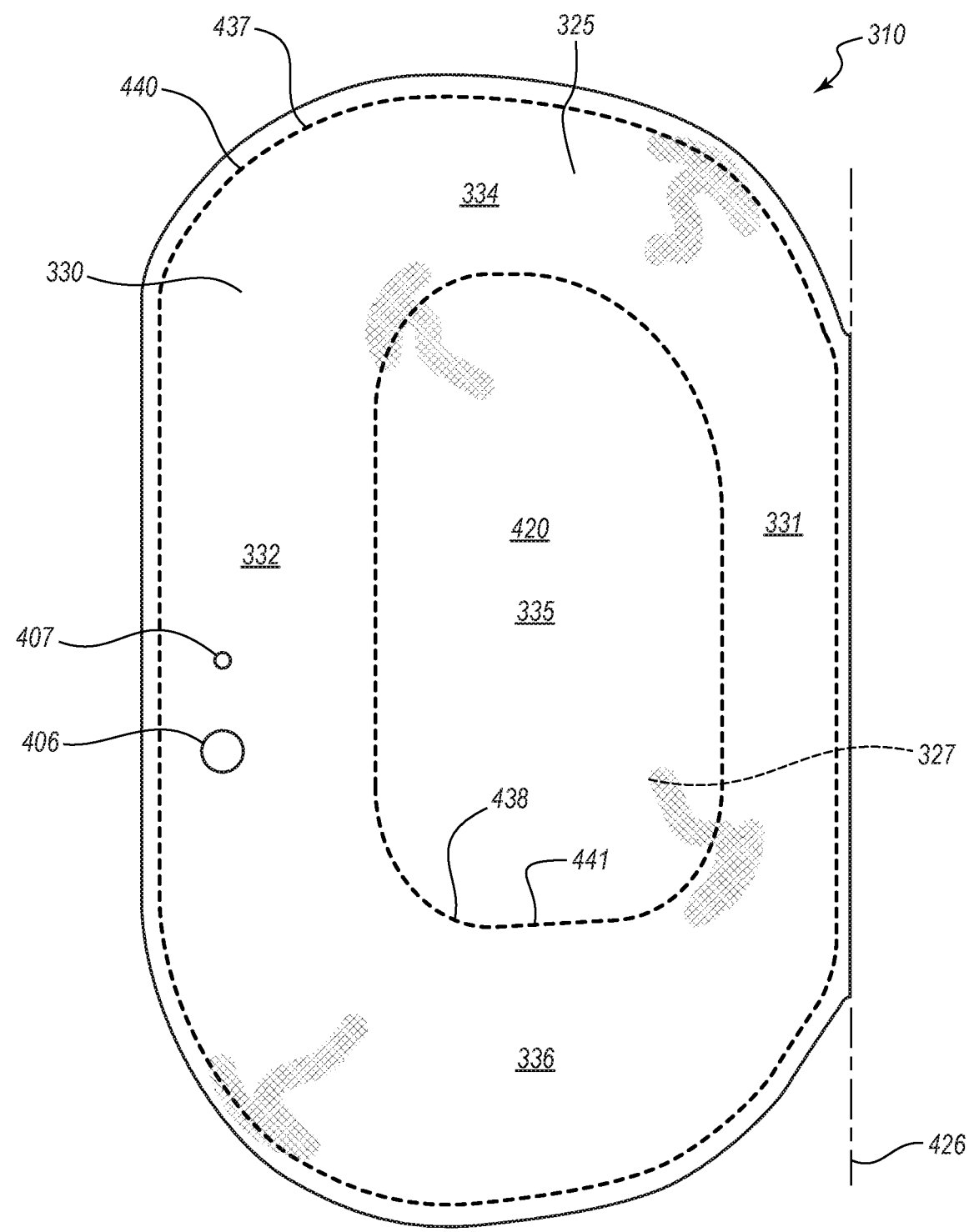
FIG. 4A is a side view of the inflatable airbag cushion of FIGS. 3A to 3C in an uninflated state.
Figure 4B:
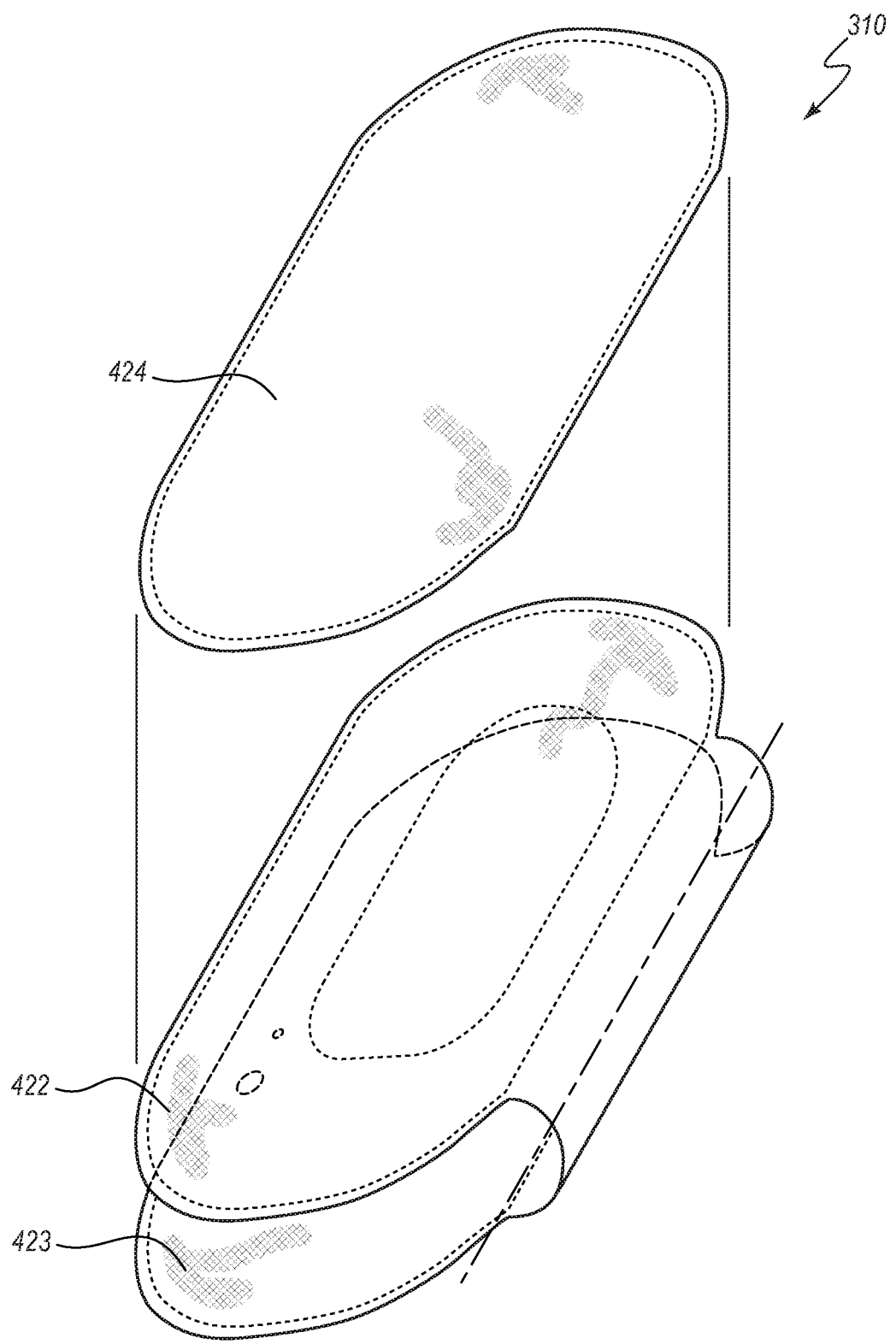
FIG. 4B is a partially exploded perspective view of the inflatable airbag cushion of FIGS. 3A to 3C.

FIGS. 3A to 3C are front views and FIGS. 4A and 4B are side views of an embodiment of an inflatable airbag assembly 300 that resembles the inflatable airbag assembly 100 described above in certain respects. Accordingly, like features are designated with like reference numerals, with the leading digits incremented to "3." For example, the inflatable airbag assembly 300 includes an inflatable airbag cushion 310 that may, in some respects, resemble the inflatable airbag cushion 110 of FIGS. 1A-2B. Relevant disclosure set forth above regarding similarly identified features thus may not be repeated hereafter. Moreover, specific features of the inflatable airbag assembly 100 and related components shown in FIGS. 1A-1C and 2A-2B may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features can apply equally to the features of the inflatable airbag assembly 300 and related components depicted in FIGS. 3A-3C and 4A-4B. Any suitable combination of the features, and variations of the same, described with respect to the inflatable airbag assembly 100 and related components illustrated in FIGS. 1A-1C and 2A-2B can be employed with the inflatable airbag assembly 300 and related components of FIGS. 3A-3C and 4A-4B, and vice versa. This pattern of disclosure applies equally to further embodiments depicted in subsequent figures and described hereafter, wherein the leading digits may be further incremented.

FIG. 3A is a front view of a portion of the interior of the vehicle 10 with an inflatable airbag assembly 300 deployed and at least partially inflated. The sidewall 16 (e.g., door) and window 18 of the vehicle 10 are shown for reference. The vehicle seating position 30 and seat assembly 40, including the seat 42, the seatback 44, and the restraint harness 46, are shown for reference. The occupant 50 is shown seated in the seat assembly 40 prior to engaging the inflatable airbag assembly 300. The shoulder 52, thorax 54, thoracic center 55, thoracoabdominal region 56, and pelvis 58 are shown for reference. The inflatable airbag assembly 300 comprises a housing 302 and an inflator 304. The housing 302, in one embodiment, may be mounted to the seatback 44 (e.g., internal to the seatback 44). The inflator 304 may be coupled to the housing 302, and may be disposed partially or completely within the housing 302.

The inflatable airbag assembly 300 comprises an inflatable airbag cushion 310. The inflatable airbag cushion 310 comprises a chamber 330 to be inflated via an inflator port (see, e.g., inflator port 406 in FIG. 4A) to an inflation pressure. The inflatable airbag assembly 300 may be deployed by action of the inflator 304, which may be activated by, for example, one or more sensors detecting the vehicle 10 being involved in a collision event. The inflator 304 may provide inflation gas 360 to the inflatable airbag cushion 310 via the inflator port 406, and may thereby cause the inflatable airbag cushion 310 to deploy from the housing 302 and begin inflating. The inflatable airbag cushion 310 may inflate to be disposed forward from the housing 302 at the seatback 44 to a position adjacent to the vehicle seating position 30 and, more particularly in one embodiment, between the vehicle seating position 30 and the sidewall 16 of the vehicle 10.

The inflatable airbag cushion 310 may comprise regions to be disposed at specific locations when the inflatable airbag cushion 310 is deployed. The regions may be positioned in the deployed state to receive and engage specific portions of the occupant 50. The inflatable airbag cushion 310 may comprise an upper region 334 to engage the shoulder 52 of the occupant 50, and a lower region 336 to engage the pelvis 58 of the occupant 50. The inflatable airbag cushion 310 may further comprise a central region 335 to engage the thoracoabdominal region 56 of the occupant 50. The upper region 334 and the lower region 336 may be portions of the chamber 330.

The inflatable airbag cushion 310 may also comprise regions that may be disposed at locations, when the inflatable airbag cushion 310 is deployed, to not engage a portion of the occupant 50. The inflatable airbag cushion 310 may comprise a rear region 331 to be disposed between the seat back 44 and the sidewall 16. As such, the rear region 331 may be disposed lateral to and rearward of the occupant 50. The inflatable airbag cushion 310 may comprise a front region 332 to be disposed lateral to and forward of the occupant 50. The rear region 331 and front region 332 may be portions of the chamber 330. In FIG. 3A, the rear region 331 is hidden behind the front region 332.

The inflatable airbag cushion 310 comprises a first contact panel 325 or sail coupled to the chamber 330 and disposed across the central region 335 of the chamber 330. The first contact panel 325 may be coupled to the chamber 330 on a lateral side of the airbag cushion 310 adjacent the occupant 50 as illustrated in FIG. 3A. The contact panel 325 may be positioned such that at least a portion of the contact panel 325 is disposed between at least a portion of the chamber 330 and the occupant 50. In some embodiments, the contact panel 325 may be positioned such that the contact panel 325 is disposed between the occupant 50 and the entire chamber 330. The first contact panel 325 may be coupled to the chamber 330 along a portion of a perimeter of the first contact panel 325 or the entire perimeter of the first contact panel 325.

The inflatable airbag cushion 310 also comprises a second contact panel 327. The second contact panel 327 may be disposed offset from the first contact panel 325 and, in some embodiments, the second contact panel 327 may be disposed between the first contact panel 325 and the sidewall 16 of the vehicle 10. The second contact panel 327 may be coupled to the chamber 330 along a portion of a perimeter of the second contact panel 327 or an entire perimeter of the second contact panel 327.

The inflation pressure within the chamber 330 may define a relatively high resistance to movement 372 to counteract (provide a force against) movement of a portion of the occupant 50, upon engagement of the occupant with the inflatable airbag cushion 310. The high resistance to movement 372 is defined by the inflation pressure. The upper region 334 and the lower region 336 of the chamber 330 provide the high resistance to movement 372 against movement of the occupant 50.

The inflatable airbag cushion 310 may be configured to produce a tension in the first contact panel 325 and the second contact panel 327 upon inflation of the chamber 330. More specifically, the chamber 330 may expand upon inflation causing separation of opposing portions of the coupling between the first contact panel 325 and the chamber 330 resulting in tension in the first contact panel 325. Similarly, the chamber 330 may expand upon inflation causing separation of opposing portions of the coupling between the second contact panel 327 and the chamber 330 resulting in tension in the second contact panel 327. In some embodiments, the chamber 330 may expand upon inflation, producing a radially directed tensile force along the entire perimeter of the first contact panel 325 and the entire perimeter of the second contact panel 327, which may, in turn, create a radially directed tension in the first contact panel 325 and the second contact panel 327.

The tension in the first contact panel 325 may define a first lower resistance to movement 374 of a portion of the occupant 50. Hence, the inflatable airbag cushion 310 may engage the thoracoabdominal region 56 of the occupant 50 with the first lower resistance to movement 374 provided at the central region 335. The tension in the second contact panel 327 may define a second lower resistance to movement 376 of a portion of the occupant 50. In some instances, the inflatable airbag cushion 310 may engage the thoracoabdominal region 56 of the occupant 50 with the second lower resistance to movement 376 provided at the central region 335.

FIG. 3B is a front view of a portion of the interior of the vehicle 10, showing the inflatable airbag assembly 300 in a deployed and at least partially inflated state, with the occupant 50 engaging the inflatable airbag cushion 310. The occupant 50 is shown in the seat assembly 40 in the vehicle seating position 30. The thorax 54, thoracic center 55, thoracoabdominal region 56, and pelvis 58 of the occupant 50 are shown for reference, as are the seat 42, seatback 44, and restraint harness 46 of the seat assembly 40. The occupant 50 has traveled in a lateral direction 170 to a first occupant position 350 and is shown engaging the inflatable airbag cushion 310. More particularly, thoracic center 55 has shifted (relative to FIG. 3A) in the lateral direction 170. The front region 332 may be disposed lateral to and forward of the occupant 50 and the rear region 331 may be disposed lateral to and rearward of the occupant 50. The shoulder 52 of the occupant 50 is engaging the upper region 334 of the chamber 330, the pelvis 58 of the occupant 50 is engaging the lower region 336 of the chamber 330, and the thoracoabdominal region 56 of the occupant 50 is engaging the central region 335. In other words, initially and simultaneously or nearly simultaneously, the shoulder 52 may engage the area of high resistance to movement 372 provided by the upper region 334, the pelvis 58 may engage the area of high resistance to movement 372 provided by the lower region 336, and the thoracoabdominal region 56 may engage the first lower resistance to movement 374 at the central region 335.

Referring to FIG. 3C, as the collision event continues, the occupant 50 has traveled farther (relative to FIG. 3B) in the lateral direction 170 to a second occupant position 352. The thoracoabdominal region 56 has further engaged the central region 335 and is further supported by the first lower resistance to movement 374 provided by the first contact panel 325. In some instances, the thoracoabdominal region 56 of the occupant 50 may also subsequently engage the second contact panel 327 when the occupant 50 is in the second occupant position 352. The thoracoabdominal region 56 of the occupant 50 is further engaging the first contact panel 325 and additionally engaging the second contact panel 327. Hence, the second contact panel 327 may provide the second lower resistance 376 to the thoracoabdominal region 56 of the occupant 50. In some instances, a total resistance to movement of the thoracoabdominal region 56 may comprise a combination of the first lower resistance to movement 374 provided by the first contact panel 325 and the second lower resistance to movement 376 provided by the second contact panel 327. As similarly described above in relation to FIG. 1D, during an oblique collision the front region 332 may engage the occupant 50 and provide a high resistance to movement 372 of portions of the occupant 50, inter alia, the head 51, shoulder(s) 52, thorax 54, thoracic center 55, thoracoabdominal region 56, and pelvis 58. In some instances of oblique impact, the inflatable airbag cushion 310 may also provide the first lower resistance to movement 374 and/or the second lower resistance to movement 376 to the thoracoabdominal region 56.

FIG. 4A is a side view of a side of the inflatable airbag cushion 310 of FIGS. 3A-3C in an uninflated state. FIG. 4B is an exploded perspective view of the inflatable airbag cushion 310. With reference to FIGS. 4A and 4B, the inflatable airbag cushion 310 may include a first fabric panel 422 and a second fabric panel 423. In one embodiment, the first fabric panel 422 and second fabric panel 423 may form the chamber 330. The first fabric panel 422 and second fabric panel 423 may be formed of a single unitary fabric panel, the fabric panel folded along a fold line 426 and coupled along an outer coupling 440 and an inner coupling 441. Each of the outer coupling 440 and the inner coupling 441 may be formed of a continuous seam. The first fabric panel 422 and second fabric panel 423 may be sealed together along a portion of the outer coupling 440. Similarly, the first fabric panel 422 and second fabric panel 423 may be sealed together along a portion of the inner coupling 441. In some embodiments, the first fabric panel 422 and second fabric panel 423 may be sealed together along the entire outer coupling 440 and/or the entire inner coupling 441. In some embodiments, the outer coupling 440 and/or the inner coupling 441 may comprise a non-sealed portion to facility venting of inflation gas 360. A seam may be formed by sewing, adhesive, radio-frequency welding, or taping, or in any other suitable manner or combinations thereof.

The chamber 330, when inflated, may form a generally toroidal shape defining an inner toroidal region 420. The inner toroidal region 420 may comprise the central region 335. The toroidal shape of the chamber 330 may also define the front region 332, the rear region 331, the upper region 334 and the lower region 336 as shown in FIG. 4A. The chamber 330 may include an outer perimeter 437 extending around the exterior of the toroidal shape. The chamber 330 may also include an inner perimeter 438 extending around the inner region 420 of the toroidal shape. In some embodiments the outer perimeter 437 may be defined by the outer coupling 440 and the inner perimeter 438 may be defined by the inner coupling 441. In some embodiments, the inflatable airbag cushion 310 and/or chamber 330 may be obround, wherein one cross-sectional dimension is greater than a perpendicular cross-sectional dimension. In the illustrated embodiment, one or both of the first fabric panel 422 and second fabric panel 423 may be disposed across the inner region 420 defining the second contact panel 327. The inflator port 406 may comprise an aperture passing through the first fabric panel 422 or the second fabric panel 423 and to the interior of the chamber 330. In other words, the inflator port 406 may be configured to admit inflation gas to the chamber 330.

The inflatable airbag cushion 310 may comprise a third fabric panel 424. The third fabric panel 424 may comprise or otherwise define the first contact panel 325. The third fabric panel 424 may be coupled to the first chamber 330 at the outer coupling 440. In other embodiments the third fabric pane 424 may alternatively or additionally be coupled to the first chamber 330 at the inner coupling 441. In some embodiments, the third fabric panel 424 may be coupled to the first fabric panel 422 at a location between the outer coupling 440 and the inner coupling 441. A portion of a perimeter of the third fabric panel 424 or an entire perimeter of the third fabric panel 424 may be coupled to one or both of the first fabric panel 422 and the second fabric panel 423 at the outer coupling 440 or the inner coupling 441. In some embodiments, the first fabric panel 422, the second fabric panel 423, and the third fabric panel 424 may have a common perimeter. In some embodiments, the outer coupling 440 may couple the first fabric panel 422, the second fabric panel 423, and the third fabric panel 424 together.

One or both of the first fabric panel 422 and the second fabric panel 423 may be disposed across the inner toroidal region 420 and comprise the second contact panel 327. In some embodiments, only a portion of one or both of the first fabric panel 422 and the second fabric panel 423 may be disposed across the inner toroidal region 420 and comprise the second contact panel 327. In still other embodiments, a separate fabric panel may be coupled to one or both of the first fabric panel 422 and the second fabric panel 423 and be disposed across the inner toroidal region 420, the separate fabric panel comprising the second contact panel 327.

Figure 5A:
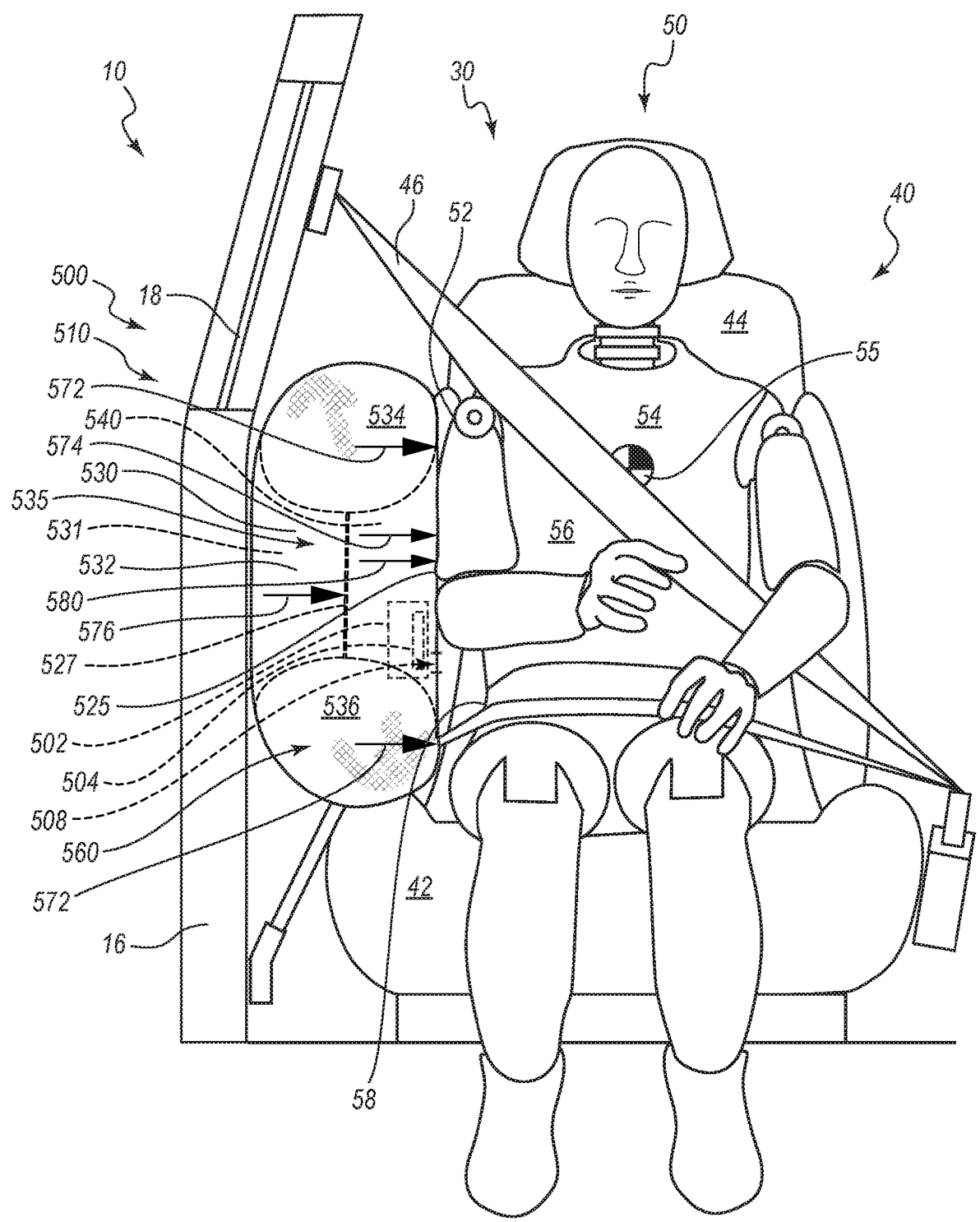
FIG. 5A is a front view of a portion of an interior of a vehicle with an inflatable airbag assembly, according to a third embodiment of the present disclosure, showing the inflatable airbag assembly in a deployed and at least partially inflated state.

FIG. 5A is a front view of a portion of the interior of the vehicle 10 with an inflatable airbag assembly 500 deployed and at least partially inflated. The sidewall 16 (e.g., a door) and window 18 of the vehicle 10 are shown for reference. The vehicle seating position 30 and seat assembly 40, including the seat 42, seatback 44, and restraint harness 46, are shown for reference. The occupant 50 is shown seated in the seat assembly 40 prior to engaging the inflatable airbag assembly 500. The shoulder 52, thorax 54, thoracic center 55, thoracoabdominal region 56, and pelvis 58 are also shown for reference. The inflatable airbag assembly 500 comprises a housing 502 and an inflator 504. The housing 502, in one embodiment, may be mounted at the seatback 44 (e.g., at a position interior to the seatback 44). The inflator 504 may be coupled to the housing 502, and may be disposed partially or completely within the housing 502.

The inflatable airbag assembly 500 comprises an inflatable airbag cushion 510. The inflatable airbag cushion 510 comprises a first chamber 530 to be inflated via an inflator port (see, e.g., inflator port 606 in FIG. 6A) to an inflation pressure. The inflatable airbag assembly 500 may be deployed by action of the inflator 504, which may be activated by, for example, detection of the vehicle 10 being involved in a collision event. The inflator 504 may provide inflation gas 560 to the inflatable airbag cushion 510 via the inflator port 606, and may thereby cause the inflatable airbag cushion 510 to deploy from the housing 502 and begin inflating. The inflatable airbag cushion 510 may inflate to be disposed forward from the housing 502 at the seatback 44 to a position adjacent to the vehicle seating position 30 and, more particularly in one embodiment, between the vehicle seating position 30 and the sidewall 16 of the vehicle 10.

The inflatable airbag cushion 510 may comprise regions to be disposed at specific locations when the inflatable airbag cushion 510 is deployed. The regions may be configured to deploy to positions to receive and engage specific portions of the occupant 50. The inflatable airbag cushion 510 may comprise an upper region 534 to engage the shoulder 52 of the occupant 50, and a lower region 536 to engage the pelvis 58 of the occupant 50. The inflatable airbag cushion 510 may further comprise a central region 535 to engage the thoracoabdominal region 56 of the occupant 50. The upper region 534 and the lower region 536 may be inflated portions of the first chamber 530.

The inflatable airbag cushion 510 may also comprise regions that may be disposed at locations, when the inflatable airbag cushion 510 is deployed, so as to not engage a portion of the occupant 50. The inflatable airbag cushion 510 may comprise a rear region 531 disposed lateral to the seat back 44 between the seat back 44 and the sidewall 16. As such, the rear region 531 may be disposed lateral to and rearward of the occupant 50. The inflatable airbag cushion 510 may comprise a front region 532 disposed lateral to and forward of the occupant 50. The rear region 531 and front region 532 may be portions of the first chamber 530. In FIG. 5A, the rear region 531 is hidden behind the front region 532.

The inflatable airbag cushion 510 comprises a first contact panel 525 or sail coupled to the first chamber 530 and disposed across the central region 535. The first contact panel 525 may be coupled to the first chamber 530 on a side adjacent the occupant 50 as illustrated in FIG. 5A. The contact panel 525 may be positioned such that at least a portion of the contact panel 525 is disposed between at least a portion of the first chamber 530 and the occupant 50. In some embodiments, the contact panel 125 may be positioned such that the contact panel 525 is disposed between the occupant 50 and the entire first chamber 530. The first contact panel 525 may be coupled to the first chamber 530 along a perimeter of the first contact panel 525. The coupling between the first contact panel 525 and the first chamber 530 may comprise a seal along at least a portion of the coupling. In some embodiments, the coupling may form a seal along the entire coupling. In some embodiments, the coupling may comprise a non-sealed portion configured to allow passage of a fluid.

The inflatable airbag cushion 510 comprises a second contact panel 527 coupled to the first chamber 530 and disposed across the central region 535. The second contact panel 527 is disposed offset from the first contact panel 525 and between the first contact panel 525 and the sidewall 16 of the vehicle 10. The second contact panel 527 may be coupled to the first chamber 530 along a perimeter of the second contact panel 527. The coupling between the second contact panel 527 and the first chamber 530 may comprise a seal along at least a portion of the coupling. In some embodiments, the coupling may form a seal along the entire coupling. In some embodiments, the coupling may comprise a non-sealed portion configured to allow passage of a fluid.

The inflation pressure within the first chamber 530 may define a relatively high resistance to movement 572 to counteract (provide a force against) movement of a portion of the occupant 50, upon engagement of the occupant with the inflatable airbag cushion 510. The high resistance to movement 572 may be primarily defined or otherwise provided by the inflation pressure. The upper region 534 and the lower region 536 of the first chamber 530 may comprise the high resistance to movement 572.

The inflatable airbag cushion 510 may be configured to produce a tension in the first contact panel 525 and the second contact panel 527 upon inflation of the first chamber 530. More specifically, the first chamber 530 may expand upon inflation causing separation of opposing portions of the coupling between the first contact panel 525 and the first chamber 530 resulting in tension in the first contact panel 525. Similarly, the first chamber 530 may expand upon inflation causing separation of opposing portions of the coupling between the second contact panel 527 and the first chamber 530 resulting in tension in the second contact panel 527. In some embodiments, the first chamber 530 may expand upon inflation producing a radially directed tensile force along the perimeter of the first contact panel 525 and second contact panel 527 which may, in turn, create a radially directed tension in the first contact panel 525 and a radially directed tension in the second contact panel 527. The tension in the first contact panel 525 may primarily define a first lower resistance to movement 574 of a portion of the occupant 50 upon engagement at the central region 535. Hence, the inflatable airbag cushion 510 may engage the thoracoabdominal region 56 of the occupant 50 with the first lower resistance to movement 574 provided at the central region 535.

The tension in the second contact panel 527 may primarily define a second lower resistance to movement 576 of a portion of the occupant 50 upon engagement at the central region 535. Hence, the inflatable airbag cushion 510 may engage the thoracoabdominal region 56 of the occupant 50 with the second lower resistance to movement 576 provided at the central region 535.

The first contact panel 525 and the second contact panel 527 in combination with the first chamber 530 form a second chamber 540, wherein the first contact panel 525 and the second contact panel 527 define opposing walls of the second chamber 540. At least one of the first contact panel 525 and the second contact panel 527 may comprise an orifice 508 configured to allow passage of a fluid. In some embodiments, one or both of the first contact panel 525 and the second contact panel 527 may comprise more than one orifice 608. In some embodiments, orifice 508 may comprise a non-sealed portion of the coupling between the first contact panel 525 and the first chamber 530 and/or a non-sealed portion of the coupling between the second contact panel 527 and the first chamber 530. In another embodiment, the orifice 508 may comprise a valve to direct, control, limit, or otherwise influence flow of air through the orifice 508.

As shown in FIG. 5A, the first contact panel 525 and the second contact panel 527 are disposed offset from each other when the inflatable airbag cushion 510 is deployed. The expansion of the first chamber 530 may cause the first contact panel 525 and the second contact panel 527 to separate and establish an interior volume of the second chamber 540. In other words, the interior volume of the second chamber 540 may increase due to expansion of the first chamber 530 during inflation of the first chamber 530. The increase in the interior volume of the second chamber 540 may cause ambient air to be drawn into the second chamber 540 through the orifice 508. Said another way, the inflation of the first chamber 530 with inflation gas 560 may cause the second chamber 540 to at least partially fill with air.

Engagement of the thoracoabdominal region 56 with the first contact panel 525 may cause the interior volume of the second chamber 540 to decrease, compressing the air within the second chamber 540 and causing a pressure within the second chamber 540. The pressure within the second chamber 540 may therefore produce a third lower resistance to movement 580 of the thoracoabdominal region 56.

Figure 5B:
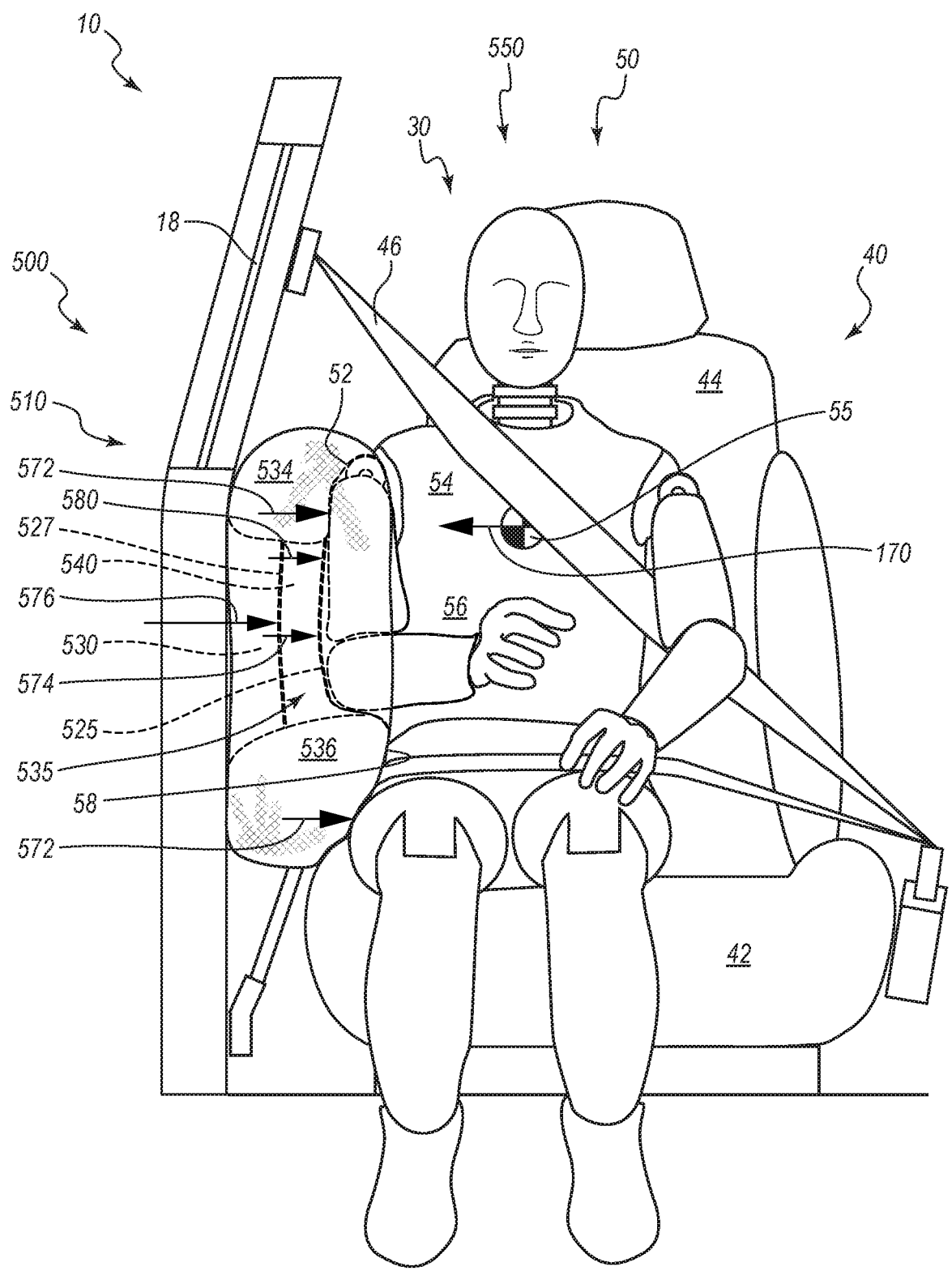
FIG. 5B is a front view of a portion of the interior of the vehicle with the inflatable airbag assembly of FIG. 5A in a deployed state and with the occupant engaging the inflatable airbag cushion.

FIG. 5B is a front view of a portion of the interior of the vehicle 10, showing the inflatable airbag assembly 500 in a deployed and at least partially inflated state, with the occupant 50 engaging the inflatable airbag cushion 510. The occupant 50 is shown in the seat assembly 40 in the vehicle seating position 30. The thorax 54, thoracic center 55, thoracoabdominal region 56, and pelvis 58 of the occupant 50 are shown for reference, as are the seat 42, seatback 44, and restraint harness 46 of the seat assembly 40. The occupant 50 has traveled in a lateral direction 170 to a first occupant position 550 or transverse position of the occupant 50 and is shown engaging the inflatable airbag cushion 510. More particularly, the thoracic center 55 has shifted (relative to FIG. 5A) in the lateral direction 170. The front region 532 may be disposed forward of the occupant 50 and the rear region 531 may be disposed rearward of the occupant 50. The shoulder 52 of the occupant 50 is engaging the upper region 534 of the first chamber 530, the pelvis 58 of the occupant 50 is engaging the lower region 536 of the first chamber 530, and the thoracoabdominal region 56 of the occupant 50 is engaging the central region 535. In other words, initially and simultaneously or nearly simultaneously, the shoulder 52 may engage the upper region 534 having the high resistance to movement 572, the pelvis 58 may engage the lower region 536 having the high resistance to movement 572, and the thoracoabdominal region 56 may engage the central region 535. In the illustrated embodiment, a total resistance to movement at the central region 535 may be a combination of the first resistance to movement 574 caused by tension in the first contact panel 525 and the third lower resistance to movement 580 caused by the pressure in the second chamber 540.

Figure 5C:
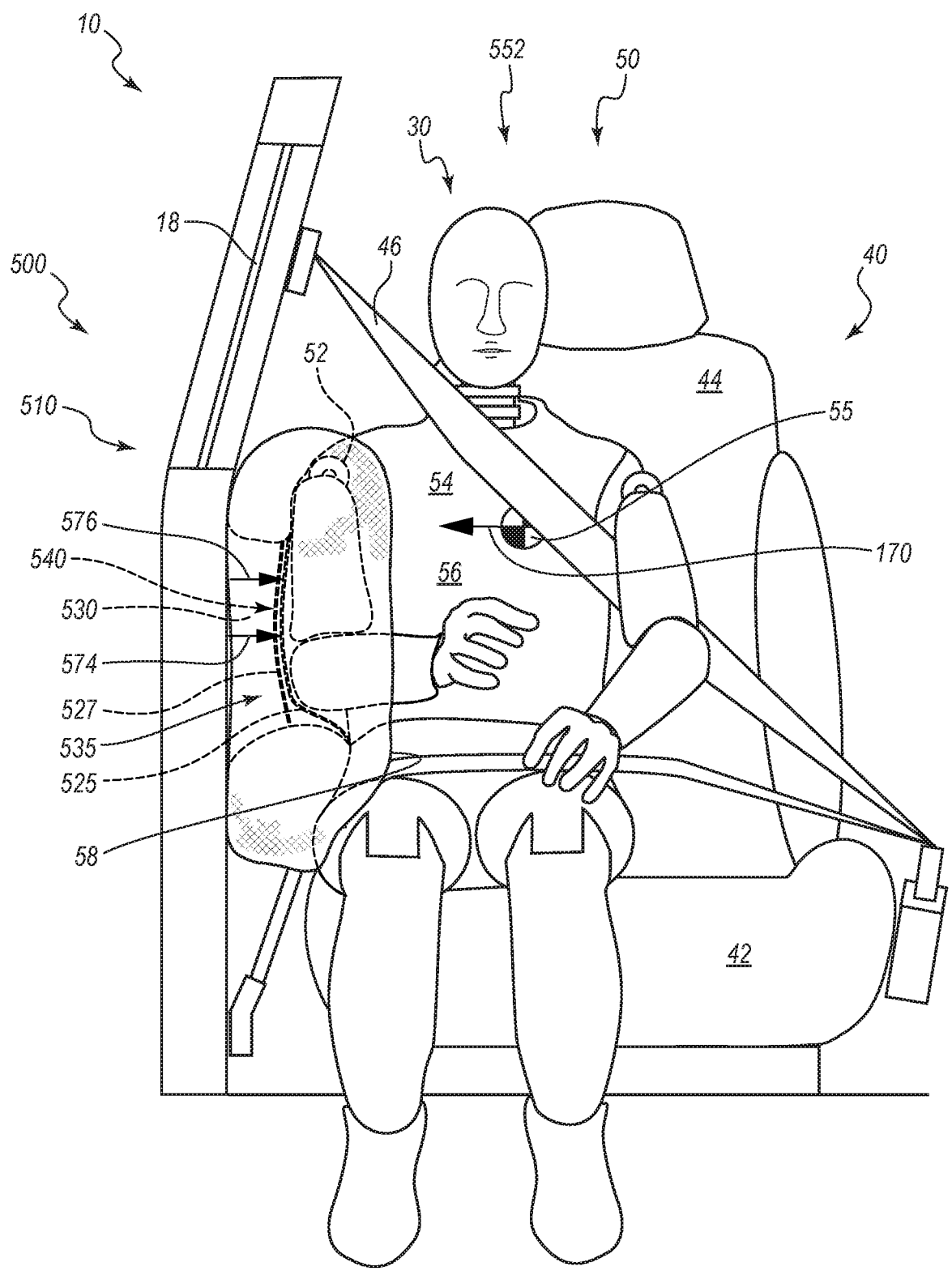
FIG. 5C is a front view of a portion of the interior of the vehicle with the inflatable airbag assembly of FIG. 5A in a deployed state and with the occupant further engaging the inflatable airbag cushion in relation to FIG. 5B.

Referring to FIG. 5C, as the collision event continues, the occupant 50 has traveled farther (relative to FIG. 5B) in the lateral direction 170 (e.g., outboard relative to the vehicle 10) to a second occupant position 552. The thoracoabdominal region 56 has further engaged the central region 535 and is further supported by the first lower resistance to movement 574 of the first contact panel 525. In the illustrated embodiment, the volume of the second chamber 540 may be substantially depleted, eliminating the third resistance to movement 580. In some instances, the thoracoabdominal region 56 of the occupant 50 may also subsequently engage the second contact panel 527 when the occupant 50 is in the second occupant position 552. Hence, the second contact panel 527 may provide the second lower resistance to movement 576 of the thoracoabdominal region 56 of the occupant 50. In some instances, a total resistance to movement of the thoracoabdominal region 56 may comprise a combination of the first lower resistance to movement 574 provided by the first contact panel 525 and the second lower resistance to movement 576 provided by the second contact panel 527. As similarly described above in relation to FIG. 1D, during an oblique collision the front region 532 may engage the occupant 50 and provide a high resistance to movement 372 of portions of the occupant 50, inter alia, the head 51, shoulder(s) 52, thorax 54, thoracic center 55, thoracoabdominal region 56, and pelvis 58. In some instances of oblique impact, the inflatable airbag cushion 510 may also provide the first lower resistance to movement 574, the second lower resistance to movement 576, and/or the third lower resistance to movement 580 to the thoracoabdominal region 56.

Figure 6A:
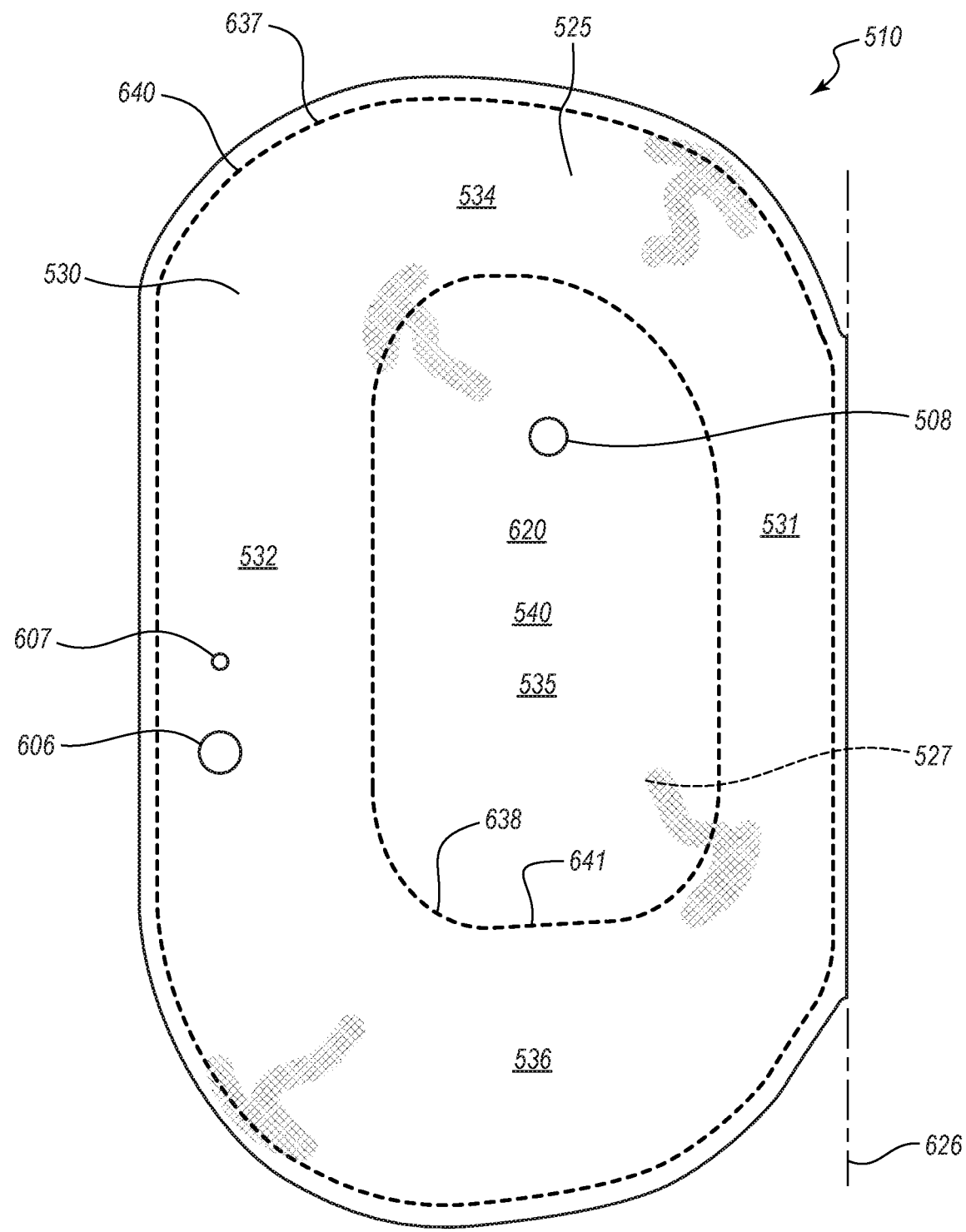
FIG. 6A is a side view of the inflatable airbag cushion of FIGS. 5A to 5C in an uninflated state.
Figure 6B:
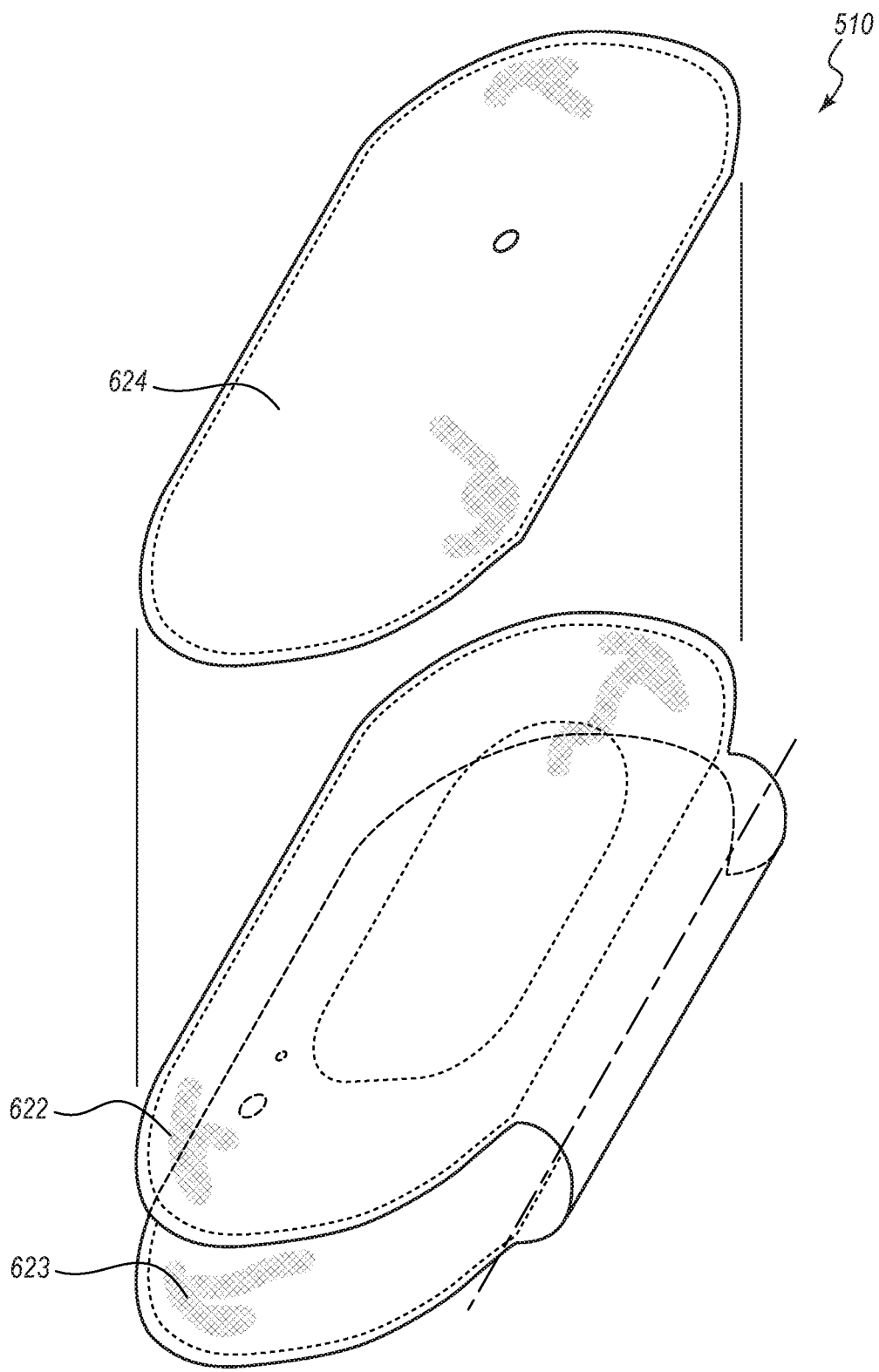
FIG. 6B is a partially exploded perspective view of the inflatable airbag cushion of FIGS. 5A to 5C.

FIG. 6A is a side view of a side of the inflatable airbag cushion 510 of FIGS. 5A-5C in an uninflated state. FIG. 6B is an exploded perspective view of the inflatable airbag cushion 510. With reference to FIGS. 6A and 6B, the inflatable airbag cushion 510 may include a first fabric panel 622 and a second fabric panel 623. In the illustrated embodiment, the first fabric panel 622 and second fabric panel 623 may form the first chamber 530. The first fabric panel 622 and second fabric panel 623 may be formed of a single unitary fabric panel, the fabric panel folded along a fold line 626 and coupled along an outer coupling 640 and an inner coupling 641. Each of the outer coupling 640 and the inner coupling 641 may be formed of a continuous seam. The first fabric panel 622 and second fabric panel 623 may be sealed together along a portion of the outer coupling 640. Similarly, the first fabric panel 622 and second fabric panel 623 may be sealed together along a portion of the inner coupling 641. In some embodiments, the first fabric panel 622 and second fabric panel 623 may be sealed together along the entire outer coupling 640 and/or the entire inner coupling 641. In some embodiments, the outer coupling 640 and/or the inner coupling 641 may comprise a non-sealed portion to facility venting of inflation gas 560. A seam may be formed by sewing, adhesive, radio-frequency welding, or taping, or in any other suitable manner or combinations thereof.

The first chamber 530, when inflated, may form a generally toroidal shape defining an inner toroidal region 620. The inner toroidal region 620 may comprise the central region 535. The toroidal shape of the first chamber 530 may also define the front region 532, the rear region 531, the upper region 534, and the lower region 536, as shown in FIG. 6A. The first chamber 530 may include an outer perimeter 637 extending around the exterior of the toroidal shape. The first chamber 530 may also include an inner perimeter 638 extending around the inner region 620 of the toroidal shape. In some embodiments the outer perimeter 637 may be defined by the outer coupling 640 and the inner perimeter 638 may be defined by the inner coupling 641. In some embodiments, the inflatable airbag cushion 510 and/or first chamber 530 may be obround, wherein one cross-sectional dimension is greater than a perpendicular cross-sectional dimension. In the illustrated embodiment, one or both of the first fabric panel 622 and second fabric panel 623 may be disposed across the inner region 620, defining the second contact panel 527. An inflator port 606 may comprise an aperture passing through the first fabric panel 622 or the second fabric panel 623 and to the interior of the first chamber 530. In other words, the inflator port 606 may be configured to admit inflation gas to the first chamber 530.

The inflatable airbag cushion 510 comprises a third fabric panel 624. The third fabric panel 624 may be coupled to the first chamber 530 at the outer coupling 640 or the inner coupling 641. In some embodiments, the third fabric panel 624 may be coupled to the first fabric panel 622 at a location between the outer coupling 640 and the inner coupling 641. The third fabric panel 624 may define the first contact panel 525. The third fabric panel 624 is coupled to one or both of the first fabric panel 622 and the second fabric panel 623 at the outer coupling 640 or the inner coupling 641. In some embodiments, the first fabric panel 622, the second fabric panel 623, and the third fabric panel 624 may have a common perimeter. In some embodiments, the outer coupling 640 may couple the first fabric panel 622, the second fabric panel 623, and the third fabric panel 624 together.

One or both of the first fabric panel 622 and the second fabric panel 623 may be disposed across the inner toroidal region 620 and comprise the second contact panel 527. In other embodiments, a separate fabric panel may be coupled to one or both of the first fabric panel 622 and the second fabric panel 623 and be disposed across the inner toroidal region 620, the separate fabric panel comprising the second contact panel 527.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The phrase "vehicle seating position" refers to a position in which an occupant is generally positioned or expected to be positioned in a vehicle (e.g., when seated in a seat of the vehicle). The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112(f). It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly comprising:
  a housing to be mounted at a seatback of a seat of a vehicle;
  an inflator; and
  an inflatable airbag cushion to receive inflation gas from the inflator and to deploy from a packaged state within the housing to a deployed state extending forward from a side of the seatback, wherein the inflatable airbag cushion in the deployed state is to be positioned laterally adjacent to a vehicle seating position, the inflatable airbag cushion comprising:
    a first chamber to be inflated by the inflation gas to be positioned in the deployed state to receive one or more of a shoulder and a pelvis of an occupant seated in the vehicle seating position and moving in a transverse direction relative to a longitudinal axis of the vehicle, wherein first chamber in the deployed state forms a substantially toroidal shape defining an inner toroidal region positioned to receive a thoracoabdominal region of the occupant moving in the transverse direction relative to the longitudinal axis of the vehicle; and
    a first contact panel disposed across the inner toroidal region and coupled to the first chamber, wherein in the deployed state, at least a portion of the first contact panel is disposed between at least a portion of an occupant-facing side of the first chamber and the vehicle seating position,
  wherein upon inflation of the first chamber, the first chamber produces a first tension in the first contact panel, the first tension configured to provide a first resistance to movement of the thoracoabdominal region of the occupant,
  wherein the inflatable airbag cushion further comprises a second contact panel disposed across the inner toroidal region of the first chamber and coupled to the first chamber,
  wherein the first contact panel and the second contact panel in combination with the first chamber define a second chamber,
  wherein at least one of the first contact panel and the second contact panel comprises an orifice, and
  wherein upon deployment of the inflatable airbag cushion, air is drawn into the second chamber.

2. The inflatable airbag assembly of claim 1, wherein the inflatable airbag cushion is configured to deploy from the housing to be disposed between the vehicle seating position and a vehicle side wall.

3. The inflatable airbag assembly of claim 1, wherein a portion of the inflatable airbag cushion is configured to deploy forward of the vehicle seating position.

4. The inflatable airbag assembly of claim 1, wherein in the deployed state, the first contact panel is disposed between the first chamber and the vehicle seating position.

5. The inflatable airbag assembly of claim 1, wherein the first contact panel is coupled to the first chamber at one of an outer perimeter of the first chamber and a location between an inner perimeter and the outer perimeter of the first chamber.

6. The inflatable airbag assembly of claim 1, wherein the first contact panel is coupled to the first chamber at an outer perimeter of the first chamber.

7. The inflatable airbag assembly of claim 1, wherein the second contact panel is disposed offset a distance outboard from the first contact panel.

8. The inflatable airbag assembly of claim 1, wherein upon inflation of the first chamber, the first chamber produces a second tension in the second contact panel, the second tension configured to provide a second resistance to movement of the thoracoabdominal region of the occupant.

9. The inflatable airbag assembly of claim 8, wherein a resistance to movement of the thoracoabdominal region of the occupant comprises a combination of the first resistance to movement and the second resistance to movement.

10. An inflatable airbag assembly comprising:
  an inflatable airbag cushion configured to deploy from a packaged state within a seatback of a seat of a vehicle to a deployed state positioned laterally adjacent to a vehicle seating position, the inflatable airbag cushion comprising:
    a first chamber to be inflated by inflation gas from an inflator and, in the deployed state, to form a substantially toroidal shape positioned to receive one or more of a shoulder and a pelvis of an occupant seated in the vehicle seating position and moving in a transverse direction relative to a longitudinal axis of the vehicle, wherein the substantially toroidal shape defines an inner toroidal region to be positioned in the deployed state to receive a thoracoabdominal region of the occupant moving in the transverse direction; and
    a first contact panel coupled to the first chamber and disposed across the inner toroidal region,
  wherein, in the deployed state, at least a portion of the first contact panel is disposed between at least a portion of an occupant-facing side of the first chamber and the vehicle seating position,
  wherein upon inflation of the first chamber, the first chamber produces a first tension in the first contact panel, the first tension configured to provide a first resistance to movement of the thoracoabdominal region of the occupant,
  wherein the inflatable airbag cushion further comprises a second contact panel coupled to the first chamber and disposed across the inner toroidal region,
  wherein the second contact panel is disposed offset of the first contact panel when the inflatable airbag cushion is in the deployed state, wherein upon inflation of the first chamber, the first chamber produces a second tension in the second contact panel, the second tension configured to provide a second resistance to movement of the thoracoabdominal region of the occupant, wherein the first contact panel is positioned to engage the thoracoabdominal region of the occupant at a first transverse position of the occupant, and the second contact panel is positioned to engage the thoracoabdominal region of the occupant at a second transverse position of the occupant, wherein the second transverse position is subsequent to the first transverse position, and wherein the second contact panel is coupled to the first chamber at an inner perimeter of the first chamber.

11. The inflatable airbag assembly of claim 10, the first contact panel and the second contact panel in combination with the first chamber define a second chamber.

12. The inflatable airbag assembly of claim 11, wherein upon deployment of the inflatable airbag cushion, air is drawn into the second chamber.

\* \* \* \* \*